United States Patent Office 3,297,997
Patented Jan. 10, 1967

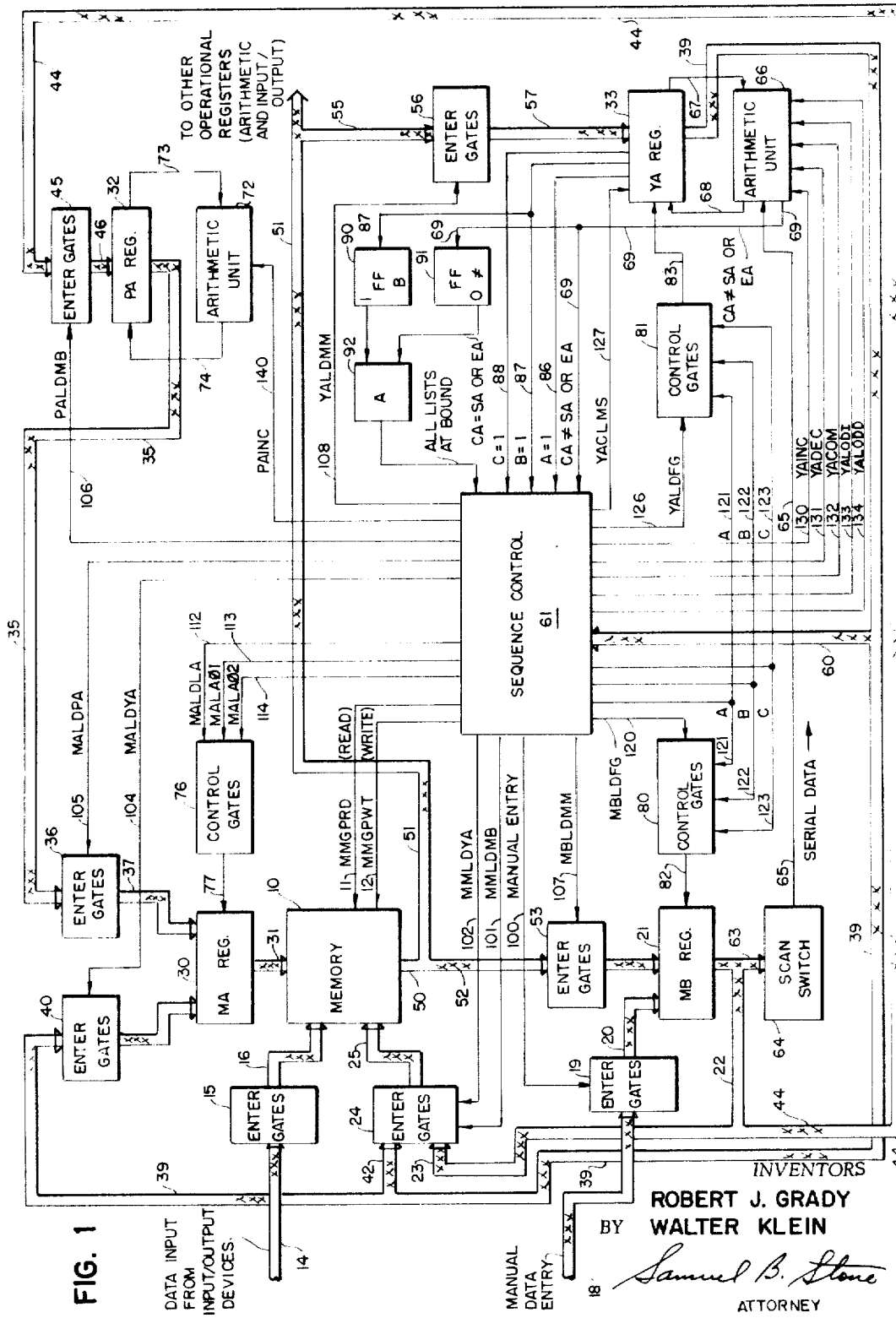

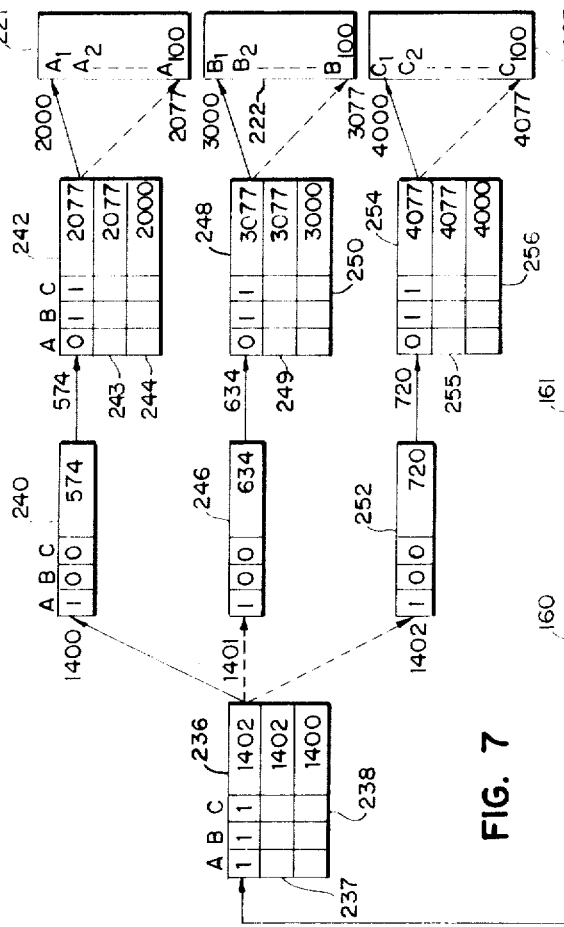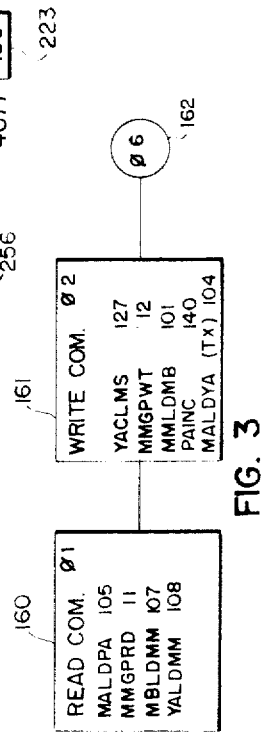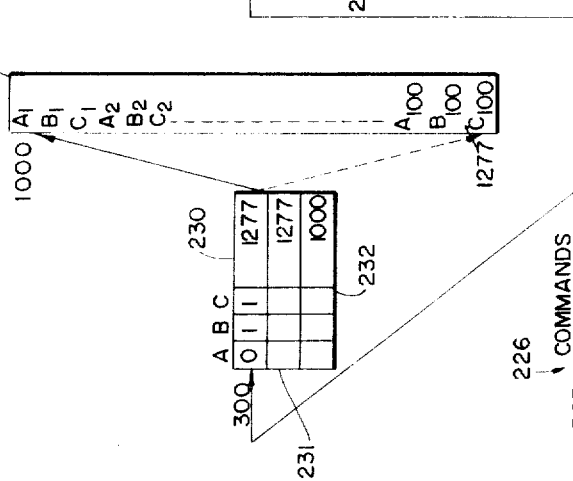

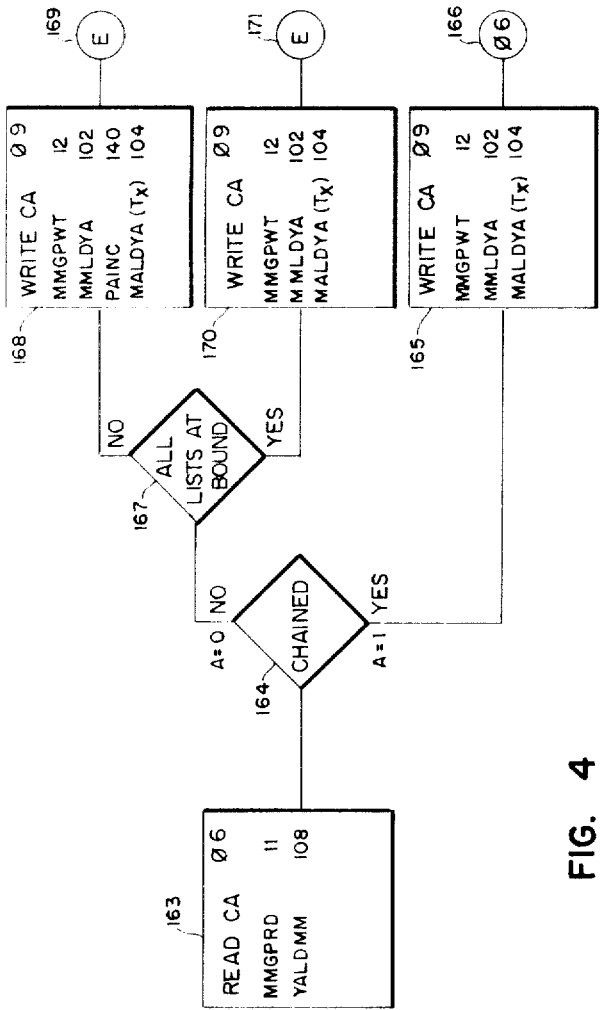
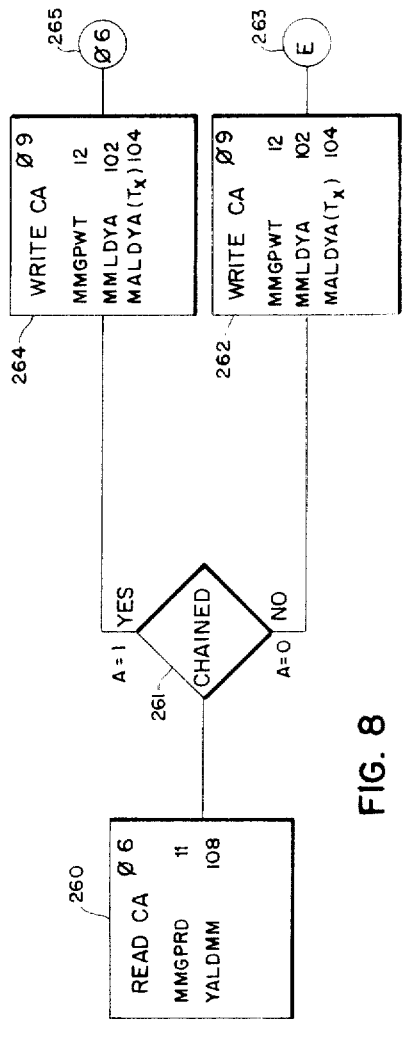
FIG. 4
FIG. 8
CONDITIONS:
M = 1 (INCREMENT MODE)
B = 0 (NO LIST CONTROL WORD)
OR
M = 3 (DECREMENT MODE)
B = 0 (NO LIST CONTROL WORD)
CONDITION:
M = 2 (STATIC MODE)
*INVENTORS*
ROBERT J. GRADY
BY WALTER KLEIN
*Samuel B. Stone*
ATTORNEY

3,297,997
LIST CONTROL
Robert J. Grady, Garden Grove, and Walter Klein, Santa Ana, Calif., assignors to Beckman Instruments, Inc., a corporation of California
Filed June 10, 1963, Ser. No. 286,794
4 Claims. (Cl. 340—172.5)

This invention relates to electronic data processing equipment of the stored program type and more particularly to the addressing of data therein.

In electronic digital data processing equipment, instruction or command words are employed to address data words and to control the operations performed thereon. The command word typically includes a plurality of binary bits, some of the bits being known as the address part of the command and some of the bits being known as the operation part or command code of the command. The command code identifies some particular operation which the equipment is to perform, and the address part of the command identifies the location in memory of the information upon which the specified operation is to be performed. In certain instances, the address part of the command word is used to identify the address in memory of another command word. Frequently a plurality of command words and data words are stored in the memory. The plurality of command words generally are arranged in a sequence called a program, with at least some of the commands being performed over and over in the same sequence.

When employing stored programs, provision frequently is made for varying the program upon the occurrence of certain conditions. Typically, index registers are utilized for performing the program modification operation or operations. Instead of the command word directly addressing the data to be operated upon, the address portion of the command word may be a base address which is supplied to a register where this base address may or may not be modified by adding to or subtracting from it the previously set contents of one or more predetermined index registers. The resulting address then refers to a location in memory from which information is extracted. This information may be a data word or another indirectly addressed control word including an address which is entered into the register where it again may be modified by indexing if desired. The last word of the sequence of words is then operated upon according to the command code in the command. The number stored in the index register and to be added to an indirect address may be any desired number. A typical example of address modification and indirect addressing employing index registers may be found in U.S. Patent No. 3,036,773.

The use of indirect addressing and index registers for address modification provides a flexible address structure. However, in many applications such as real time processing of data more flexible address modification means is desirable.

Accordingly, it is a feature of the present invention to provide a more efficient and flexible address modification means in digital data processing equipment by which specified addresses may be replaced with a subsequent address, and with which iterative operations on lists of data may be performed.

An additional feature of the present invention resides in the utilization of a list control structure having a current address with appropriate flag bits, an end address and a start address stored in adjacent storage cells, and whereby the current address may be sequentially incremented or decremented to address a list of operands, and wherein one of the flag bits in the current address controls the cyclic operation of this process.

An additional feature of the present invention is a programmable list control structure incorporated in the general purpose part of a processor and employing a list control format with appropriate flags therein and hardware implementation therefor.

A further feature of the present invention resides in the method of using stored list control structures for address modification and cyclic operation in an efficient manner.

As used herein the term list, list control word or list control structure means a current address word including appropriate flag bits, an end address word and a start address word stored in adjacent memory cells or slots. In an illustrative example of the concepts of the present invention, any number of list control structures may be stored in a memory of a digital data processor. Each of these lists is addressed by the address portion of a command which also specifies the ultimate operation to take place on the data addressed by the current address. The address in the command addresses only the current address word. When a current address word is addressed, it may be incremented or decremented depending on the mode of operation specified by the command, compared with the end or start address, and used to ultimately address an operand within a list of operands. A flag bit in the current address word may be detected to cause the cyclic operation of this incrementation or decrementation and compare cycle. This feature of cyclic operation is extremely beneficial where repetitive operations (such as addition, subtraction, multiplication, division, linearization, etc.) must be performed on a list of operands.

The list control structure of the present invention provides numerous features. A single command may reference a single storage address which is used iteratively to select and execute an operation upon each member of a group of stored operands. The group of operands addressed by the list control structure may be of any size (other than one) within the capacity of the storage medium (memory). The group of operands addressed may be located at any sequential list of addresses within the storage medium. Any number of list control structures may be programmed in a stored program data processor within its memory capacity. The operation of the list control structure is completely programmable, permitting program specification and machine manipulation of the currently referenced address, and the initial and terminal addresses of the list of operands. Three modes of list control operation may be specified by any command. These are the static mode, in which the operand address selected by the list control structure is the same as the previously selected address; the increment mode, in which the next higher address is selected sequentially; and the decrement mode, in which the next lower address is selected sequentially. As noted previously, operation of the list control structure may be performed cyclically, i.e., reference to a list presently at a terminal address by a command specifying the increment mode automatically selects the list address as the next address. Similarly, reference to a list at the initial address in the decrement mode automatically selects the terminal address.

The specification and drawings herein further describe additional features, and the hardware implementation necessary to carry them out, relating to programmable multiple list addressing and automatic command skip control at a list boundary. The features of these concepts, their operation and implementation are claimed in co-pending U.S. Patent Application, entitled "List Control," Serial No. 286,795 of Walter Klein, filed concurrently herewith and assigned to the assignee of the present invention. Briefly, these additional concepts relate to modifications of and improvements in the above described list control concepts wherein multiple level lists may be addressed serratum and whereby a programmed command directing an operation to be performed at the end of the present program is automatically skipped or not effectively addressed until all list control structures have reached a terminal condition.

Other features and objects of the invention will be better understood from a consideration of the following detailed description when read in conjunction with the attached drawings in which:

FIG. 1 is a block diagram of the portion of a data processing computer constructed in accordance with the teachings of the present invention for addressing data;

FIGS. 2a and 2b illustrate respectively the command word format and the list control format employed in the system of FIG. 1;

Figure 5:
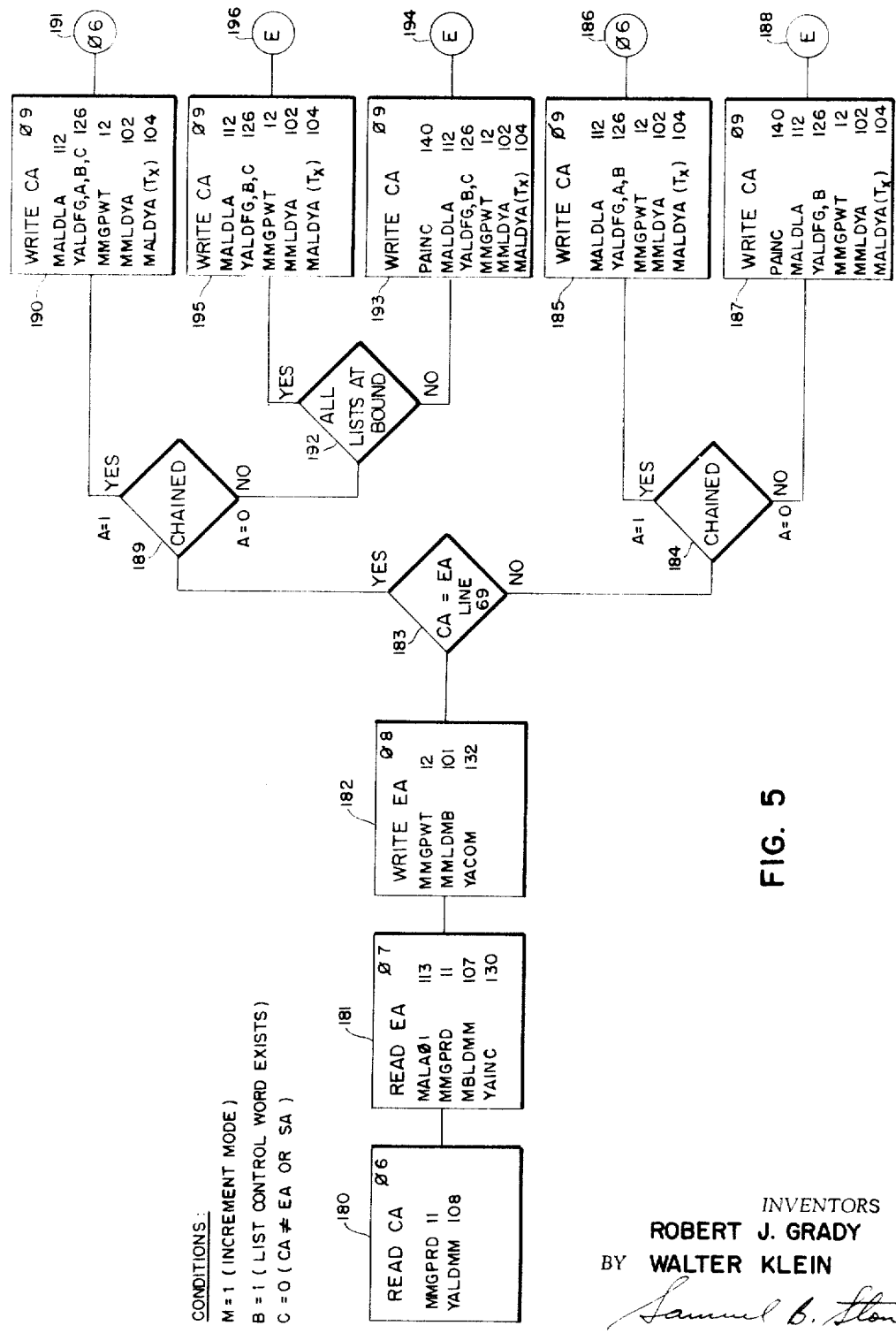

FIGS. 3 through 6 and 8 through 10 are operation sequence diagrams illustrating the sequence states of operation performed under specified conditions; and FIG. 7 is a diagram showing exemplary processing of data employing the concepts of the present invention.

The concepts of the present invention are applicable to all data processors and particularly to those involved in real time applications such as telemetry, communications, data acquisition, hybrid computations, process control, and in which general purpose computations may be made including performance analysis, system checkout and maintenance, data reduction and correlation, and engineering and scientific calculations. A typical example of such an application may be the reduction of data relating to temperature, fuel flow, etc. from a rocket test. This data as it is derived from thermocouples, flowmeters, strain gauges, etc., is generally in the form of analog voltages and must be converted to engineering terms. The external data from the measuring devices is digitized (converted to digital information) and applied to one or more input/output devices. The data is then transferred from the input/output device to the memory of the data processer from which it is subsequently extracted and operated on. It may be necessary to multiply, add, etc. one or more values to the derived voltage to provide the resulting output. Additionally, it may be desirable to linearize the data. Complex functions may be involved, such as where the measuring transducers measure the pressure across a venturi and this information must be converted to indicate fuel flow. The data then may be transferred to an input/output device to be recorded on magnetic tape, printed, etc. The concepts of the present invention are applicable in addressing the data stored in memory in order that it may subsequently be transferred to the appropriate equipment for performing the desired operations on this data.

Referring now to FIG. 1, a portion of a digital data processor or digital computer is shown in block diagram form. The various blocks are labeled according to their function and are standard components well known to logic designers. Single lines interconnecting boxes represent the transfer of single bits of information, control signals or serial bits of information. Cables interconnecting the boxes represent parallel data flow.

Typically, a digital data processor or computer includes three major components: (1) a general purpose arithmetic sub-system; (2) an input/output subsystem; and (3) a memory which is shared by the former two subsystems. FIG. 1 illustrates a memory 10, which may be a conventional magnetic core memory, and the other components of the general purpose subsystem required for implementation of the addressing features of the present invention. The registers and other components for performing the typical arithmetic and control operations, such as addition, subtraction, multiplication, etc. are not illustrated. Also not illustrated are the input/output devices, such as, a control console, paper and magnetic tape units, typewriters, etc., which may be connected with the logical blocks and memory shown in FIG. 1.

Data is read into or from the memory 10 by supplying an address for the data to the memory, the data, and a read or write signal. Each of the control lines in FIG. 1 has a mnemonic designation associated therewith. For example, lines 11 and 12 connected with the memory 10 supply read and write signals thereto, respectively. The mnemonic term MMGPRD associated with the line 11 means *read* the general processor main memory 10. The mnemonic term MMGPWT associated with the line 12 means *write* into the general processer main memory 10. In addition to a discussion of the mnemonic terms associated with each of the control lines, these terms and their meaning will be listed subsequently.

Data (including addresses, commands and information) from input/output devices is supplied through a cable 14, enter gates 15 and a cable 16 to the memory 10. The gates 15 may be controlled by the input/output devices. Data may be manually entered into the memory 10 by means of push button control, or the like, on the control console through a cable 18, enter gates 19 and a cable 20 to a memory buffer register 21 (termed MB register). This data is supplied to the memory 10 from the memory buffer register 21 through a cable 22, a cable 23, enter gates 24 and a cable 25.

Data in the memory 10 is addressed by means of a memory address register 30 (termed MA register) which is connected to the memory 10 by means of a cable 31. Addresses are supplied to the memory address register 30 from a program address register 32 (termed PA register) or an address modification register 33 (termed YA register). The program address register 32 is connected to the memory address register 30 by means of a cable 35, enter gates 36 and a cable 37. The address modification register 33 is connected to the memory address register 30 through a cable 39, enter gates 40 and a cable 41. The address modification register 33 also may supply data (including addresses) to the memory 10 by means of the cable 39, a cable 42, the enter gates 24 and the cable 25. The memory buffer register 21 supplies data to the program address register 32 through the cable 22, a cable 44, enter gates 45 and a cable 46.

Although the operation of the components of FIG. 1 will be described in greater detail subsequently, a brief description of the previously described components may be helpful at this point. Information may be entered into the memory 10 from external input/output devices through the enter gates 15. Information also may be entered into the memory 10 by means of the enter gates 19, the memory buffer register 21, and the enter gates 24. Data may be entered from the address modification register 33 through the enter gates 24 into the memory 10. Data within the memory 10 is addressed by means of the memory address register 30 which receives addresses from the program address register 32 and the address modification register 33. The program address register 32 supplies to the register 30 the address of the next command to be performed by the computer; whereas the address modification register 33 supplies to the register 30 addresses of data (this data may be an operand, or an address) to be operated upon during the program.

Data is supplied from the memory 10 through a cable 50. This cable 50 is connected to a cable 51 which in turn is connected to other operational registers (not shown) of the computer. These operational registers perform the actual operation, computation, etc., and are not pertinent to the concepts of the present invention. Memory data is supplied through the cable 50, a cable 52 and enter gates 53 to the memory buffer register 21. The memory 10 may be a destructive type memory, and when a word is read therefrom it may be transferred back to the same location by means of the memory buffer register 21 so as not to lose the word. Data also is supplied from the memory 10 through the cable 50, the cable 51, a cable 55, enter gates 56 and a cable 57 to the address modification register 33. In addition to supplying data to the memory 10 and the register 30, the address modification register 33 supplies the command being operated upon through the cable 39 and a cable 60 to a sequence control 61. As will be described in greater detail subsequently, the sequence control 61 merely functions to supply signals on its output lines at appropriate times to cause the memory 10 to read, data to be transferred through gates, etc. The command word is stored in the sequence control 61 merely to provide an indication therein of which mode of operation is in process. The sequence control 61 includes a clock for supplying timing pulses, a counter to count these pulses and conventional logical gates and toggles to cause the appropriate control signals to be produced on the output lines at the proper times depending upon the operations being performed. Preferably, the sequence control 61 is constructed with electronic devices, but mechanical sequencers or manual control signal sequencing may be utilized if speed of operation is not important.

The memory buffer register 21 is connected through the cable 22 and a cable 63 to a scan switch 64. The scan switch 64 is a conventional parallel-to-serial converter which converts the parallel data output from the memory buffer register 21 to a serial train of data bits on an output line 65. The output line 65 is connected to an arithmetic unit 66.

The YA register 33 is connected with the arithmetic unit 66 by means of lines 67 and 68. The arithmetic unit 66 provides three functions: (1) to compare serially (bit by bit) the contents of the YA register 33 with the contents of the MB register 21 and to provide an output signal (a one) on an output line 69 if any respective bit in the words in these registers are not equal; (2) to increment (add one) or to decrement (subtract one) to or from the contents of the YA register 33 and return the result to this register; and (3) to load the YA register 33 with the one incremented or decremented contents of the MB register 21. The comparison of the contents of the YA and MB registers and the loading of the one incremented or decremented contents of the MB register into the YA register occur simultaneously. In a similar manner, an arithmetic unit 72 is connected with the program address register 32 by means of lines 73 and 74. The arithmetic unit 72 functions only to increment (add one) to the word stored in the PA register 32.

Control gates 76 are connected to the memory address register 30 by means of a line 77. The control gates 76 respond to input signals to change either one or both of the two least significant bits (bits 1 and 2) in the memory address register 30. As will be seen subsequently, this operation provides for the selection of any one of three sequential addresses rather than only the single address stored in the MA register 30. Control gates 80 and 81 are connected through respective lines 82 and 83 to the MB register 21 and the YA register 33, respectively. These control gates 80 and 81 respond to input signals to set any one or more of the flag bits A, B, or C of an address word stored in the MB or YA registers.

Lines 86 through 88 and 69 are connected from the YA register 33 to the sequence control 61 to store for a cycle of operation the status (one or zero) of the respective A, B and C bits of the address word and whether the current address has reached a limit value in respective toggles in the sequence control 61. The toggles in control 61 associated with the lines 86 through 88 are set (if the respective bit is a one) at sequence state $\phi 6$, and the toggle in control 61 associated with the line 69 is set (if the current address is not equal to its end or start address) at sequence state $\phi 8$ as will be explained in greater detail subsequently. When the A bit is a one, addresses or list control words or structures are chained (the present current address is an intermediate, indirect address). When the B bit is a one, a list control word or structure (current address word, end address word and start address word) is present. When the C bit is a one, the current address has reached a limit value (the current address is equal to the end address or the starting address). As will be further explained later, a pair of flip-flops or toggles 90 and 91 and an AND gate 92 are interconnected to indicate whether all list control words being used in connection with a given program are at a boundary or terminal condition or not, i.e., indicate that a list has occurred and that all lists which have occurred have reached a limit value. The line 69 is connected to the flip-flop 91 to set this flip-flop at a sequence state $\phi 8$ (explained in connection with FIGS. 3–6 and 8–10) to one when the current address is not equal to the end address or the start address. The line 87 which supplies the B bit is connected to the flip-flop 90 to set this flip-flop at a sequence state $\phi 6$ to one when the B bit is equal to one. The one output of the flip-flop 90 is connected as an input to the AND gate 92, and the zero output of the flip-flop 91 is connected as a second input to the AND gate 92. When the flip-flop 90 is set to one and the flip-flop 91 is set to zero, the AND gate 92 provides a one output. When the output of the AND gate 92 is a one, this indicates that all lists are at bound, i.e., a list control word has occurred and all list control words which have occurred have reached a terminal value (current address equal to end or start address). Otherwise, if the AND gate 92 provides a zero output, either no list has occurred or some list has not reached a limit value.

Turning briefly to FIGS. 2a and 2b, it will be seen that the command word format indicates a command word having eighteen bits. Bits 1 through 9 indicate the address of an operand or another address. Bits 10 through 12 indicate an address modifier code. For the purposes of the present discussion, only three address modification codes are employed. When the M code is equal to one, an increment mode is used; when M is equal to two, a static mode is used; and when M is equal to three, a decrement mode is used. The operations in these particular modes will be explained in greater detail subsequently.

Bit 13 of the command word is a memory section flag which indicates how specific memory sections (as distinguished from data word locations) are addressed and forms no part of the present invention. Bits 14 through 18 contain the command code which is the actual command (load, store, add, multiply, etc.) to be performed on the addressed operand.

FIG. 2b illustrates a list control structure employed in carrying out the concepts of the present invention. A list of data (operands or addresses) is represented by a set of three cells located in memory, with the address portion of the command word referring to one set of three cells. The three cells store respectively the current address, the end address, and the start address, and their respective flag bits. The only flag bits relevant to the present invention are the A, B, and C flag bits which occupy bit positions 18, 17 and 16 of the current address word. The current, end and start address are stored in sequential memory locations designated by X, X+1 and X+2 in FIG. 2b. In an indirect address mode the address in the command word is the address X of the current address word. The end and start addresses are addressed automatically. The bits A, B and C have the following meanings:

A=0—CURRENT ADDRESS is the final effective address

A=1—CURRENT ADDRESS is an intermediate, indirect address

B=0—Simple indirect address structure, no list control structure (no END or START address)

B=1—LIST CONTROL STRUCTURE with END and START addresses exists

C=0—CURRENT ADDRESS has not reached a limit value

C=1—CURRENT ADDRESS has reached a limit value

Since the list control words (current, end and start addresses) occupy three sequential memory locations for convenience in mechanization, the address X (of the current address word) in the command word must end in either zero or four (in octal code) when the B bit is a one.

As noted previously, the various control lines from the sequence control 61 to the components shown in FIG. 1 are labeled with mnemonic terms. An exception is line 100 connected to the enter gates 19 from the sequence control 61 and labeled manual entry. A manual control on the computer console, or the like, supplies a signal to the sequence control 61 which in turn supplies a signal on the line 100 to condition the enter gates 19. When the enter gates 19 are conditioned data may be manually entered through the cable 18, the gates 19, and the cable 20 to the memory buffer register 21.

The following is a list of the mnemonic terms used in FIG. 1 and in the following description of operation thereof.

| Term | Line | Meaning |
|---|---|---|
| MALAφ1 | 113 | Set bit 1 of MAR to 1 (addresses end address). |
| MALAφ2 | 114 | Set bit 2 of MAR to 1 (addresses start address). |
| MALDLA | 112 | Reset bits 1 and 2 of MAR to zero (addresses current address). |
| MALDYA | 104 | Load MAR with contents of YAR. |
| MBLDFG | 120 | Load MBR in bit positions 18, 17, 16 with flags (1) A, B, C. |
| MBLDMM | 107 | Load MBR with memory data. |
| MMGPRD | 11 | Cause memory to perform read cycle. |
| MMGPWT | 12 | Cause memory to perform write cycle. |
| MMLDMB | 101 | Load memory cell with contents of MBR. |
| MMLDYA | 102 | Load memory cell with contents of YAR. |
| PAINC | 140 | Increment by one contents of PAR. |
| PALDMB | 106 | Load PAR with contents of MBR. |
| YACLMS | 127 | Erase all of command in YAR except address portion. |
| YACOM | 132 | Compare the YAR with the MBR contents. |
| YADEC | 131 | Decrement by one contents of YAR. |
| YAINC | 130 | Increment by one contents of YAR. |
| YALDFG | 126 | Load YAR in bit positions 18, 17, 16, with flags (1) A, B, C. |
| YALDMM | 108 | Load YAR with memory data. |
| YALODD | 134 | Load YAR with the by one decremented contents of MBR. |
| YALODI | 133 | Load YAR with the by one incremented contents of MBR. |
| A | 121 | used with MBLDFG or YALDFG — A—flag (1), bit 18 of current address. |
| B | 122 | | B—flag (1), bit 17 of current address. |
| C | 123 | | C—flag (1), bit 16 of current address. |

OTHER ABBREVIATIONS USED IN FIGS. 3 THROUGH 6 AND 8 THROUGH 10

| Term | Meaning |
|---|---|
| COM | Command. |
| CA | Current address. |
| EA | End address. |
| SA | Start address. |
| (T_x) | Action to be taken at the end of a sequence state. |

Lines 101 and 102 are connected between the sequence control 61 and the enter gates 24 and are respectively labeled MMLDMB and MMLDYA. The line 101 supplies a signal to condition the enter gates 24 to load the memory 10 from the MB register 21. The line 102 supplies a conditioning signal to the enter gates 24 to load the memory 10 from the YA register 33.

Lines 104 and 105 connected between the sequence control 61 and the respective enter gates 40 and enter gates 36 are respectively labeled MALDYA and MALDPA. The line 104 supplies a conditioning signal to the enter gates 40 to load the MA register 30 from the YA register 33. The line 105 supplies a conditioning signal to the enter gates 36 to load the MA register 30 from the PA register 32. A line 106 is connected between the sequence control 61 and the enter gates 45 connected to the PA register 32. This line is labeled PALDMB and supplies a signal to condition the gates 45 to supply data to the PA register 32 from the MB register 21. In a similar manner, a line 107 is connected between the sequence control 61 and the enter gates 53. This line is labeled MBLDMM and supplies a signal to condition the gates 53 to load the MB register 21 from the memory 10. A line 108 labeled YALDMM is connected to supply a conditioning signal to the enter gates 56 to load the YA register 33 from the memory 10.

Lines 112 through 114 are connected from the sequence control 61 to the control gates 76. These lines are respectively labeled MALDLA, MALAφ1 and MALAφ2. The line 112 supplies a signal to the control gates 76 to reset to zero the two least significant bits of the address in the MA register 30. The line 113 supplies a signal to the control gates 76 to set to one the least significant bit of the address in the MA register 30. The line 114 supplies a signal to the control gates 76 to set to one the second least significant bit of the address in the MA register 30. The MA register 30 is used to store the address X of a current address word during an operating cycle, and by the simple expedient of resetting or setting certain of the least two significant bits in this address the current address (at address X — reset bits 1 and 2 to zero), the end address (at address X + 1 — set bit 1 to one), or the start address (at address X + 2 — set bit 2 to one) may be selected.

Lines 120 through 123 are connected from the sequence control 61 to the control gates 80. These lines are respectively labeled MBLDFG, A, B and C. In certain instances it is necessary to reinsert one or more of the flag bits A, B and C in the MB register 21. This is accomplished by applying a flag bit (a one) through the control gates 80 when these gates are conditioned by a signal on the line 120. In a similar manner, a line 126 and the lines 121 through 123 are connected from the sequence control 61 to the control gates 81. The lines 121 through 123 supply the A, B and C bits when the line 126, labeled YALDFG, conditions the control gates 81 to insert one or more of these bits into the YA register 33. A line 127, labeled YACLMS, is connected between the sequence control 61 and the YA register 33 to clear the most significant bits in the YA register 33 under certain circumstances which will be discussed subsequently. The registers shown in FIG. 1 are conventional flip-flop shift registers. The gates consist of conventional AND and OR circuits.

Lines 130 through 134 are connected between the sequence control 61 and the arithmetic unit 66. These lines are respectively labeled YAINC, YADEC, YACOM, YALODI and YALODD. These lines supply appropriate control signals to the arithmetic unit 66. The line 130 supplies a signal to the arithmetic unit 66 to cause it to increment the contents of the YA register 33. This operation is carried out serially with a one being added to the contents of the YA register 33 in a conventional manner. The data in the YA register 33 is shifted serially through the arithmetic unit 66 which adds one to this data and returns the result to the YA register on the line 68. In a similar manner, the line 131 supplies a signal to the arithmetic unit 66 to cause it to decrement (subtract one) the contents of the YA register 33.

The line 132 supplies a signal to the arithmetic unit 66 to compare the contents of the MB register with the contents of the YA register. This is accomplished by applying the contents of the MB register 21 through the scan switch 64 and the line 65 to the arithmetic unit 66 along with the contents of the YA register 33. The contents of these two registers are compared serially (i.e., each respective bit from each register is compared sequentially) and if any one or more bits are not equal a toggle or flip-flop is set and provides a one output signal on the line 69 indicating that the current address is not equal to the end address or the start address.

The line 133 supplies a signal to the arithmetic unit 66 to condition it to increment by one of the contents of the MB register 21 which is supplied serially by the scan switch 64, and to supply this incremented data to the YA register 33. This is accomplished in a serial fashion in the same manner as when the contents of the YA register 33 are incremented, but the data comes from the MB register 21 instead of the YA register 33. In a similar manner, the line 134 supplies a signal to the arithmetic unit 66 to load the YA register 33 with the decremented by one contents of the MB register 21.

The PA register 32 and arithmetic unit 72 function in a similar manner to the YA register 33 and the arithmetic unit 66. However, the arithmetic unit 72 functions only to increment the contents of the PA register 32. A line 140, labeled PAINC, is connected from the sequence control 61 to the arithmetic unit 72. When a signal is applied on the line 140, the arithmetic unit 72 adds one to the contents of the PA register 32.

As noted previously, the address portion of a command is employed to address data which may be an operand or a further address. FIG. 3 illustrates the two sequence states $\phi1$ and $\phi2$ necessary to address or fetch a command. Throughout the operation sequence diagrams (which are not circuit diagrams) shown in FIGS. 3 through 6 and FIGS. 8 through 10, numbered boxes with interconnecting lines are used to illustrate the operations performed and the decisions made during respective sequence states constituting a cycle of operation. A cycle progresses from left to right in the drawings. Certain control signals cause operations to be performed in each state, then in the next state other signals cause different operations, etc., until the cycle is complete. At the end of the cycle, the process continues to some other cycle as shown in the drawings or goes on to execute the command.

Blocks 160 and 161 in FIG. 3 illustrate the operations and control signals involved in first and second states of operation (identified as $\phi1$ and $\phi2$). The command word (shown in FIG. 2a) is read from the memory 10 at state $\phi1$. The control signals supplied by the sequence control 61 necessary to cause the command to be read are listed in the box 160 along with the respective control line numbers. The operations illustrated in boxes 160 and 161 are conventional operations and form no part of the present invention. These operations are set forth to provide a better understanding of the over-all operation of the list control structure shown in FIG. 1. The signal MALDPA is applied on the line 105 to the enter gates 36. This signal allows the enter gates 36 to transfer the address of the next command in a program from the PA register 32 to the MA register 30. It is assumed, that the program address word, for exemplary purposes, is the address of the first command of a sequence to be performed. A signal MMGPRD is applied on the line 11 to the memory 10 to cause the memory 10 to read the data (in this case the command addressed by the PA register 32 and stored in the MA register 30) at the address specified by the MA register 30 from the memory into the memory data bus 50. A signal MBLDMM is applied on the line 107 to the enter gates 53 to allow this data (command) to be entered into the memory buffer register 21. In a similar manner, a signal YALDMM is applied on the line 108 to condition the enter gates 56 to allow the command to be entered into the YA register 33. These operations complete the sequence necessary to read a command from the memory 10.

Turning to the second state of operations shown by the box 161, the command is written. Although not shown in the box 161, the command is written into a register in the sequence control 61 in order to supply the sequence control 61 with information concerning the command word presently being utilized. For example, the mode of operation (M equal one, two or three) is utilized within the sequence control 61 to determine whether the YA register will be held static, incremented or decremented. Again, this particular operation forms no part of the present invention and is set forth merely to give a better understanding of the manner in which commands are read to and from the memory 10. A signal MMLDMB is applied on the line 101 to the enter gates 24 to allow the command which was read at state $\phi1$ into the MB register 21 to be read from the MB register 21 back into the memory 10. Additionally, a write signal MMGPWT is supplied on the line 12 to the memory to allow the memory 10 to store this command at the address specified by the MA register 30 (which is the address from which the command was read).

A signal YACLMS is supplied on the line 127 to the YA register 33. This signal causes the most significant bits (the command code, S and M mode portions) of the command word to be cleared in the YA register 33. Since the YA register 33 is employed for address modification there is no need to have portions of the command word other than the address stored in this register. Also at state $\phi2$, the PA register 32 is incremented by supplying a PAINC signal on the line 140 to the arithmetic unit 72. This signal on the line 140 causes the arithmetic unit 72 to add one to the contents of the PA register 32. The contents of the PA register, which is a conventional shift register, are shifted out and into the arithmetic unit 72 in which one is added to the contents of the PA register and returned by the line 74 to the PA register. The PA register now stores the address of the next command. The last signal occurring in state $\phi2$ is the signal MALDYA which is supplied on the line 104 to the enter gates 40. This signal conditions the enter gates 40 to allow the address portion of the command now stored in the YA register 33 to be transferred and stored within the MA register 30.

Thus, the PA register now contains the address of the next command to be subsequently executed, the MA register 30 contains the address portion of the command word which, depending upon the mode of operation (M code), may be the address of an operand or another address. The YA register 33 contains this same address. After the command is read in state $\phi1$, and written in state $\phi2$ the operation of the system shown in FIG. 1 proceeds to state $\phi6$ as indicated by the circle 162. The intermediate states $\phi3$ through $\phi5$ are not relevant to the present invention.

FIG. 4 illustrates the sequence states for a cycle of operation for one of the simpler operations performed by the system shown in FIG. 1. Throughout the discussion of FIGS. 4 through 6 and 8 through 10 which illustrate the various specific modes of operation of the system shown in FIG. 1, the particular conditions (the M code) and the B and C bits in the list control word are set forth in the drawing. Rectangular boxes in these figures represent operations, diamond boxes represent decisions, and circles represent advance to another cycle or to execute a command. If the value of a bit is not given, it is immaterial to the particular operation shown in a given figure. In FIG. 4, the M code specified is M equal one which indicates the increment mode of operation. The B bit in the list control word is a zero and hence no list control word (i.e., no end and start addresses) is involved. The operations illustrated in this figure are also applicable to the decrement mode ($M=3$). As shown in FIG. 4, the current address is read from the memory, certain decisions are made, and the current address is returned to the memory. After these operations, the command is either executed by the appropriate equipment associated with the system shown in FIG. 1, or the operation is returned to state $\phi 6$ for continuance of another cycle of operation. At state $\phi 6$ indicated by a box 163, the current address is read from the memory 10 by applying the signal MMGPRD on the line 11 to the memory 10 and by applying the signal YALDMM on the line 108 to the enter gates 56. The signal on the line 11 causes the memory to read the current address from the location specified by the address presently stored in the MA register 30. The signal on the line 108 conditions the gates 56 to allow this current address to be entered into the YA register 33.

Assuming that the A bit in the current address word (see FIG. 2b) is a one, this current address is not the address of the particular operand sought, but is an indirect address (i.e., the address of another address which may be the address of the operand or the address of another address). Since the A bit is a one, a decision box 164 indicates that addresses are chained and that the operation proceeds to the particular operation at state $\phi 9$ shown by a box 165. As shown in the box 165, the current address is written back into the memory 10 by applying the signals MMGPWT and MMLDYA on the respective lines 12 and 102. The signal on the line 12 causes the memory to write, and the signal on the line 102 conditions the gates 24 to allow the current address to be read from the YA register 33 back into the memory 10 at the address specified by the MA register 30. As the last event at state $\phi 9$, the signal MALDYA is applied on the line 104 to the enter gates 40 to store the current address from the YA register 33 into the MA register 30. The MA register 30 now contains a different address. Typically, the MA register 30 originally contained an address from a command which was the address of the current address fetched at state $\phi 6$. The MA register 30 now contains this current address which is now the address of another address (if the A bit was a zero, the current address would be the address of an operand). At the end of state $\phi 9$, the sequence of operation returns to state $\phi 6$ as indicated by the box 166. The cycles of operation now to be performed may be the same as that shown in FIG. 4, or as shown in FIGS. 5, 6, or 8 through 10. Cycles will continue until the addresses are no longer chained and the A bit in the current address word is equal to zero. When the A bit is zero, a command will be executed at the end of the respective cycle.

Assuming that the A bit is equal to zero, a second decision indicated by a box 167 in FIG. 4 is made to determine if all lists are at bound, i.e., that a list has existed some time during the cycles of operation, and that there is no current address which is not equal to an end address or a start address. This decision is made by the flip-flops 90 and 91 and the AND gate 92 shown in FIG. 1. As will be amplified subsequently during the discussion of other diagrams, the flip-flops 90 and 91 are reset at time $\phi 9$ (of a previous cycle) if the A bit is zero. The reset lines for these flip-flops are not shown for simplicity of illustration and to prevent cluttering of FIG. 1 with minor details. The B bit is stored in the flip-flop 90 (set to one if B is one) at time $\phi 6$. If a current address is not equal to its end or start address, the flip-flop 91 is set to one at state $\phi 8$. As noted previously, conventional flip-flop toggles in the sequence control 61 are set to indicate the status (a toggle is set to one when the respective bit is a one) of the A, B and C bits in the YA register at state $\phi 6$ and a similar toggle is set at state $\phi 8$ if the current address is not at a terminal value. These toggles in control 61 are reset at state $\phi 9$. Thus, these toggles merely serve to store these indicia for a cycle of operation.

Assuming first that all lists are not at bound, either the B bit in all current address words involved in the present cycles of operation have not been a one (no list control words) or there is some current address involved in the present cycles of operation which is not yet equal to the end address or the start address. In this case, the sequence proceeds to state $\phi 9$ indicated by a box 168. The current address is written back into the memory 10 by supplying the signal MMGPWT on the line 12 to the memory 10 and the signal MMLDYA on the line 102 to the enter gates 24 in the same manner as discussed previously in connection with the box 165 in FIG. 4. A signal PAINC is supplied on the line 140 to increment the contents of the PA register 32 by one thereby storing in the PA register 32 the address of the next command to be performed. It will be noted that the PA register 32 now has been incremented twice (at state $\phi 2$ indicated by box 161 in FIG. 3, and at state $\phi 9$ indicated by the box 168 in FIG. 4). The reason for double incrementation will be discussed in greater detail subsequently. Briefly, this is called an automatic command skip since an intermediate command has been skipped.

As the last event in state $\phi 9$ indicated in the box 168, the signal MALDYA is applied on the line 104 to transfer the present current address from the YA register 33 to the MA register 30. At the end of the state $\phi 9$, the present command is executed as indicated by the E within a circle 169. Although not forming a part of the present invention, the command code is used to perform the desired operation on the operand found at the present current address (addressed by the MA register 30).

Assuming that all lists are at bound, the decision box 167 indicates a different exit path on the diagram in FIG. 4. All lists are at bound if there has been a list and no current address is not equal to its end or start address. This information is supplied by the flip-flops 90 and 91 and the AND gate 92. If a list has ever occurred, the B bit in the current address word was a one which was stored in the flip-flop 90 at state $\phi 6$. If all current addresses have become equal to their respective end and start addresses, the flip-flop 91 provides a zero output to the AND gate 92 (if any current address is not equal to its end or start address, the flip-flop 91 stores a one). The AND gate 92 responds to a one and zero output from the respective flip-flops 90 and 91 to provide a one output to the sequence control 61. This one output indicates that all lists are at bound. The operation then proceeds to state $\phi 9$ indicated by a box 170 wherein the current address from the YA register 33 is rewritten into the memory 10 upon the application of the signals MMGPWT and MMLDYA. As before, the last signal is MALDYA which stores the present current address in the MA register 30. The command is then executed as indicated by the E in a circle 171 as discussed previously. It will be noted in this instance at state $\phi 9$, that the PA register 32 was not incremented by one. Thus the PA register 32 still contains the address of the second command word which typically, as will be explained in greater detail subsequently, is a branch or exit command indicating that the operation is to branch to some other command word or to go on to some other operation.

In summary, the sequence states illustrated in FIG. 4 indicate how a current address is read from the memory 10, and how certain decisions are made to determine whether the command will be executed, another cycle will be performed, and which next command will be addressed by the PA register 32. This figure briefly illustrates the operations for chaining of address words and skipping commands until a boundary is reached. These particular operations will be gone into in greater detail in a discussion of FIG. 7 which shows an example of operation illustrating the various features of the present invention Referring now to FIG. 5, it is assumed that the command has been appropriately extracted or fetched as illustrated in FIG. 3. FIG. 5 further illustrates other operations performed when a list control word exists. The B bit in the current address word is a one and indicates that a list control word including a current address, end address and start address exists. The mode is the increment mode, and the C bit in the current address is zero thereby indicating that the current address is not presently equal to the end or start address. At state $\phi6$ indicated by a box 180, the current address is read from the memory 10. The signal MMGPRD is supplied on the line 11 to the memory 10 to cause the memory to read. The signal YALDMM is supplied on the line 108 to condition the enter gates 56 which allow the current address word to enter the YA register 33. At state $\phi7$ indicated by a box 181 the end address word is read. It will be remembered that the current address, end address and start address words are stored in adjacent sequential memory slots as indicated in FIG. 2b. Therefore, the end address word may be selected by increasing the contents of the MA register 30 by one. This is accomplished by supplying the signal MALA$\phi1$ on the line 113 to the control gates 76. This signal causes the control gates 76 to set the least significant bit (bit No. 1) of the MA register 30 to one. The two least significant bits of the current address are always zeroes, and by setting the first bit to one the end address is selected.

The signal MMGPRD is supplied to the memory 10 by the line 11 to cause the memory to read the end address word from the address specified by the MA register 30. The signal MBLDMM is supplied on the line 107 to the enter gates 53 which allow the end address word to be transferred to the MB register 21 (which subsequently will return the end address back to its appropriate slot). The signal YAINC is supplied on the line 130 to the arithmetic unit 66. This signal causes the arithmetic unit 66 to add one to the contents of the YA register 33 thereby incrementing by one the contents thereof.

The end address is then written back into the memory 10 as indicated by a box 182 at state $\phi8$. The signal MMGPWT is supplied on the line 12 to the memory 10, and the signal MMLDMB is supplied on the line 101 to the enter gates 24 to allow the transfer of the end address word from the MB register 21 back to the memory 10 at the address from which it was extracted. The signal YACOM is supplied on the line 132 to the arithmetic unit 66. This signal allows the end address in the MB register 21 to be compared with the present current address (current address at state $\phi6$ plus one) in the YA register 33. As noted previously, this comparison takes place serially with the scan switch 64 converting the parallel data from the MB register 21 to serial data on the output line 65. Each bit of the two addresses is compared, and if any inequality exists, a signal is supplied on the output line 69 indicating this result. This decision is indicated by a box 183 in FIG. 5.

Assuming for the moment that the current address was not equal to the end address, the next decision to be made is whether or not list control words are chained. This decision is indicated by a box 184. Assuming that the lists are chained, the A bit in the current address is a one. The operation proceeds to state $\phi9$ as indicated by a box 185 wherein the current address is rewritten into the memory 10. The signal MALDLA is supplied on the line 112 to the control gates 76. This signal causes the two least significant bits in the MA register 30 to be reset to zero thereby allowing the contents of the MA register 30 to be returned to the address of the current address. The signal YALDFG is applied on the line 126 to the control gates 81 along with signals on the lines 121 and 122. This operation sets A and B bits of one into the YA register 33 in the event these bits have been lost. These bits were previously ones since the B bit was stated to be a one in the sequence shown in FIG. 5, and the A bit was a one as indicated by the chained decision box 184. Signals are supplied on the lines 12 and 102 to cause the contents of the YA register 33 (presently the current address of state $\phi6$ incremented by one) to be stored in the memory 10. Thus, the current address is stored in the memory 10 in the appropriate current address slot addressed by the MA register 30, and this current address has been incremented by one. The signal MALDYA is supplied on the line 104 to the enter gates 40. This signal conditions the gates 40 and allows the contents of the YA register 33 to be transferred into the MA register 30. Since the contents of the YA register 33 are the present current address incremented by one, this word is stored in the MA register as the address of the next current address word to be addressed. The process returns to state $\phi6$ as indicated by a circle 186 containing $\phi6$. The A, B and C bits of this next current address word (addressed by the incremented value of the present current address) may be different or the same as the A, B and C bits of the present current address word.

As shown in FIG. 5, other operations may occur depending upon the equality of the current and end address, whether the A bit is a one or a zero, and whether all lists are at bound. Assuming that the current address again is not equal to the end address, but that the A bit is equal to zero, the cycle progresses to state $\phi9$ as indicated by a box 187. In state $\phi9$ indicated by the box 187, the current address (current address of state $\phi6$ plus one) is written back into the memory 10. The signal PAINC is supplied on the line 140 to increment the PA register 32. This signal occurs because the process is now at the end of a chain and ready to execute the present command on the operand found at the present current address stored in the YA register (the current address of state $\phi6$ plus one) and the PA register is set to address the next command in the sequence of commands. The signal MALDLA is supplied on the line 112 to reset the two least significant bits in the MA register 30 to thereby address the current address slot present at state $\phi6$. The signal YALDFG is supplied on the line 126 along with a signal on the line 122 to the control gates 81 to store the B bit of one in the YA register. Since no signal is supplied on the lines 121 and 123 to the control gates 81 A and C bits of zero are stored to the YA register 33. Signals are supplied on the lines 12 and 102 to read the incremented current address (the current address of state $\phi6$ plus one) from the YA register 33 into the memory 10. The last signal in state $\phi9$ is the MALDYA signal applied on the line 104 to condition the enter gates 40. This signal allows the current address to be transferred from the YA register 33 and stored in the MA register 30. This current address is now the address of the operand to be executed as indicated by a circle 188.

If the current address is found to be equal to the end address as indicated by the decision box 183 in FIG. 5, additional decisions must be made. These decisions of whether the lists are chained and whether all lists are at a bound are the same as the similar decisions discussed in connection with FIG. 4. The ultimate operation in state $\phi9$ is substantially the same as the operations discussed in connection with FIG. 4 with the exception of two additional signals MALDLA and YALDFG in FIG. 5. Assuming that the current address is equal to the end address and that the lists are chained, the appropriate decision is indicated by a box 189. Since the A bit is a one, the operation proceeds to state $\phi9$ indicated by a box 190. This operation is similar to the state $\phi9$ operation indicated by the box 165 in FIG. 4. However, since at least one list control word is involved in the operations shown in FIG. 5, an additional signal MALDLA is applied on the line 112 to the control gates 76. As noted previously, since the least significant bit in the MA register 30 was increased by one in state $\phi7$ to address the end address, this bit must be reset to zero at state $\phi9$ to restore the address of the current address slot (the same as at state φ6) to the MA register 30. This resetting operation was not involved in connection with the operation shown in FIG. 4 since no list control word (B was equal to zero in FIG. 4) existed. Signals are supplied on the lines 12 and 102 to transfer the current address word stored in the YA register 33 to the memory 10 at the address of the current address word specified by the MA register. A signal YALDFG is applied on the line 126 to the control gates 81 to store ones in bit positions A, B and C. The C bit is set to one because the current address now is equal to the end address. This setting of bits A, B and C was not involved in connection with the operation in FIG. 4 because the contents of the YA register 33 were not disturbed (incremented, etc.) and hence there was no chance that the A, B and C bits were lost.

The last signal in state φ9 is the MALDYA signal applied on the line 104 to the enter gates 40. As before, this signal allows the transfer of the new current address (the current address of state φ6 plus one) to the memory MA register 30 to serve as the address of the next following address (not the address of an operand since the A bit is a one). Thus, the operation now proceeds to state φ6 to go through another cycle as indicated by a circle 191.

If the A bit in the current address word of state φ6 were a zero, the box 189 indicates that the process then makes the all lists at bound decision indicated by a box 192. If all lists are not at bound, the operation proceeds to state φ9 as indicated by a box 193 and to the execution operation indicated by a circle 194. If all lists are at bound, the operation proceeds to state φ9 as indicated by a box 195 and subsequently to the execution operation indicated by a circle 196. Both of the operations illustrated by the boxes 193 and 195 are identical, with the exception that the box 193 indicates that the PA register 32 is incremented by one. If all lists are not at a bound the PA register is incremented by one which causes a skip of an intermediate command (the PA register was incremented the first time at state φ2 illustrated by the box 161 in FIG. 3, and incremented a second time in state φ9 indicated by the box 193 thereby skipping over an intermediate command). In state φ9 indicated by the box 195 when all lists are at bound, the PA register 32 is not incremented thereby taking the second command (provided by the incrementation at state φ2 in FIG. 3) which frequently is a branch or exit command.

Figure 6:
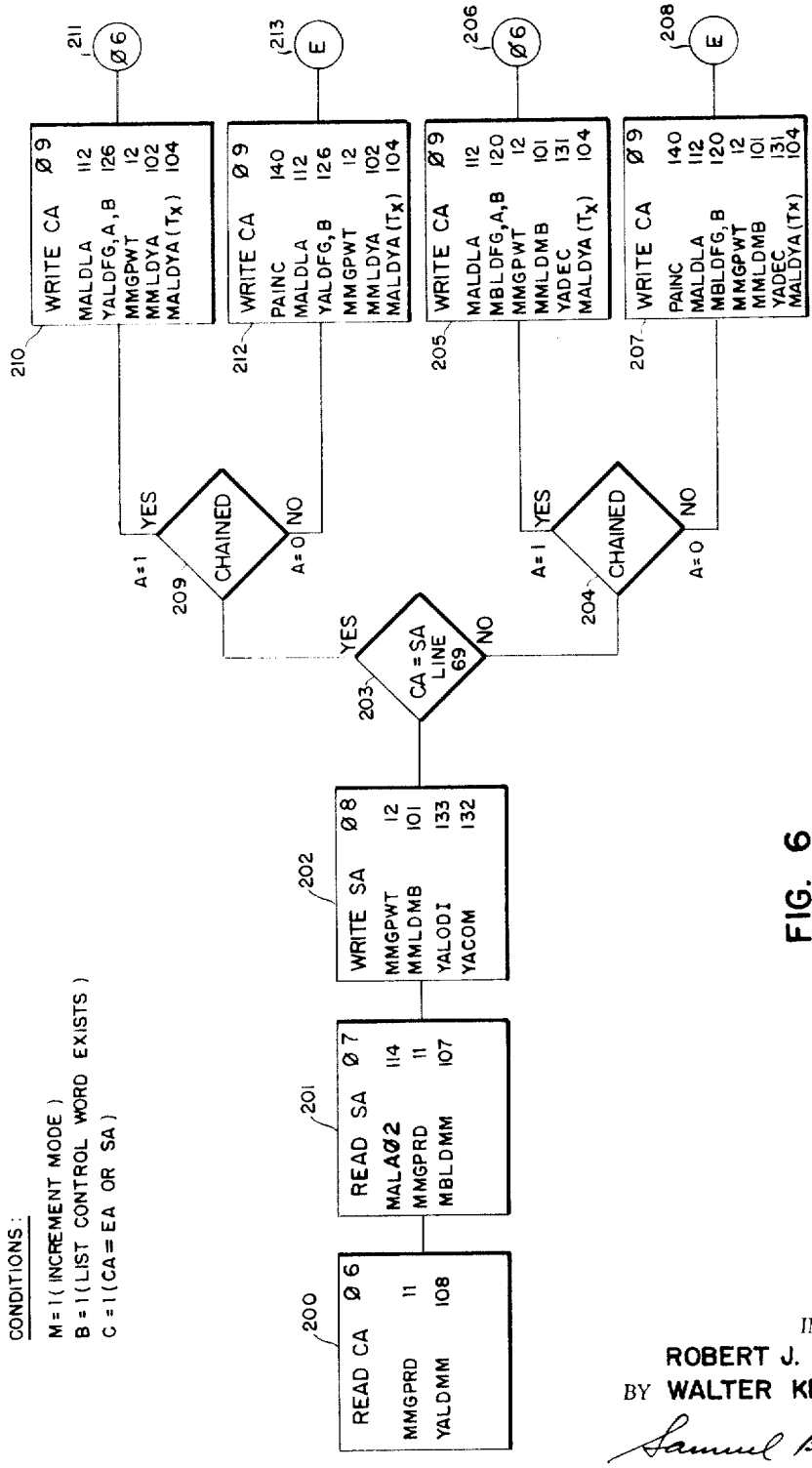

FIG. 6 illustrates the sequence states and operations in a cycle of operation when in the increment mode, and the B and C bits are ones. Since the C bit is equal to a one, the present current address is equal to its associated end or start address. This is a typical initial condition of operation as will be better understood subsequently in connection with the discussion of FIG. 7. At sequence state φ6 shown by a box 200, the current address word is read from the memory 10 and stored in the YA register 33. At state φ7 shown by a box 201 the signal MALAφ2 is supplied on the line 114 to the control gates 76 to set the second bit in the MA register 30 to one to thereby address the start address. A signal is applied on the line 11 to the memory 10 to cause the memory to read, and the signal MBLDMM is applied on the line 107 to condition the enter gates 53 to allow this start address to be stored in the MB register 21.

At sequence state φ8 shown by a box 202, the start address is rewritten into the memory 10 at the address from which is was extracted by supplying a signal on the line 12 to the memory 10 and a signal on the line 101 to the enter gates 24. The signal YACOM is applied on a line 132 to the arithmetic unit 66 to cause a comparison between the start address stored in the MB register 21 and the current address stored in the YA register 33 in the same manner as discussed previously. Whether or not these two addresses are equal is indicated by a signal on the line 69 (a one means that the addresses were not equal). Simultaneously with this comparison, the signal YALODI is applied on a line 133 to the arithmetic unit 66 to cause the start address from the MB register 21 plus one to be stored in the YA register 33. It should be noted that the scan switch 64 can transfer data serially on the line 65 at the same time that the MB register 21 is static and transferring its contents back to the memory 10. Now the YA register 33 contains the start address from the MB register 21 incremented by one. As will be explained in greater detail in a discussion of state φ9, this incrementation of the start address and transfer to the YA register 33 may cause the flag bits A, B and C to be stored improperly, and thus at state φ9 these bits will be inserted in the YA register 33 or the MB register 21.

Generally in starting a list control operation, the end or the start address also is stored in the current address slot (at address X). Depending upon the mode of operation (increment or decrement, respectively), this current address is replaced by start or end address respectively to commence the list control operation. This replacement is accomplished as shown in FIG. 6, not by actually incrementing or decrementing the current address, but by replacing the current address with the start address (or end address) plus one. However, as will be seen subsequently, the end address rather than the start address may have been stored in the current address slot. In this case, the contents of the YA register (the start address plus one) must be corrected and this occurs by decrementing the contents of the YA register at state φ9 (i.e., the start address plus one presently is stored in the YA register 33, and this correction is accomplished by subtracting a one therefrom resulting in the actual start address being stored in the YA register 33). Since the start address (or end address) does not contain the flag bits A, B and C, these bits must be stored as will be explained subsequently.

Assume that the current address is found not to equal the start address as represented by a decision block 203 in FIG. 6, the next decision to be made is whether or not addresses are chained as shown by a decision box 204. Assuming that the addresses are chained (the A bit of the current address word in state φ6 is a one and was stored in the sequence control during the operations at state φ6), the operation proceeds to state φ9 as indicated by a box 205. The start address word which was extracted from the memory 10 at state φ7 is presently still stored in the MB register 21. This start address will now be stored as the current address (at address X) in the memory 10. Since the start address did not contain appropriate A, B and C bits, a signal MBLDFG is applied on the line 120 along with signals on the lines 121 and 122 to store A and B bits of one in the MB register 21. No signal is applied on the line 123 and hence a C bit of zero (current address not at a terminal value) is stored in the MB register 21. A signal MALDLA is applied on the line 112 to the control gates 76 to cause the MA register 30 to again address the current address slot (at state φ7 the MA register 30 addressed the start address slot). A signal is applied on the line 12 to the memory 10 and a signal is applied on the line 101 to the enter gates 24 to cause the start address stored in the MB register 21 to be transferred to the memory 10 at the address specified by the MA register 30. Hence, at this time the previous start address is now stored as the current address in the current address slot (at the address X). Since the start address plus one was stored in the YA register 33 at state φ8, a YADEC signal is applied on a line 131 to the arithmetic unit 66 to cause decrementation of the contents of the YA register 33. Hence, the YA register 33 now contains the start address word which existed at state φ7 and which is now stored in the memory 10 as the present current address word. The signal MALDYA then is applied on the line 104 to condition the enter gates 40. The start address, which now is the new current address, is transferred from the YA register 33 to the MA register 30. At this time, the MA register 30 stores the present current address word (which was the start address at state $\phi 7$) as the address of the next current address word. Since addresses were chained, the command is not yet executed and the sequence of operation returns to state $\phi 6$ as indicated by a circle 206.

If the current address was not equal to the start address, and the addresses were not chained, the cycle would proceed to state $\phi 9$ as indicated by a box 207 in FIG. 6. The process is identical to the state $\phi 9$ operation indicated by the box 205 except only a B bit of one (A and C bits of zero) is stored in the MB register 21. Additionally, the PA register 32 is incremented upon the occurrence of the PAINC signal on the line 140. As noted previously, when a command is to be executed and all lists are not at bound, the PA register 32 is incremented. The command is now executed as indicated by a circle 208.

Assuming now that the current address was found to be equal to the start address in FIG. 6, the cycle will proceed through state $\phi 9$ as indicated by a box 210 and then to a cycle beginning at state $\phi 6$ as indicated by a circle 211 if addresses or lists are chained, or through state $\phi 9$ as indicated by box 212 and onto execution of the command as indicated by a circle 213 if addresses or lists are not chained. If the A bit is a one, the A and B bits of one are read into the YA register 33 upon the occurrence of a YALDFG signal on the line 126 as indicated by the box 210. These bits are inserted into the YA register 33 because these bits were lost when its contents were replaced by the start address plus one at state $\phi 8$. The address in the MA register 30 is reset to the address of the current address word (at address X) upon the occurrence of a signal on the line 112, and signals on the lines 12 and 102 cause the current address word in the YA register 33 to be read into the memory 10. It will be noted, that if the current address is not equal to the start address the address word in the MB register 21 is transferred to the memory 10 at state $\phi 9$ as indicated by the box 205 or the box 207. When, as in the present example, the current address is equal to the start address, the start address read at state $\phi 7$ plus one which was stored in the YA register 33 at state $\phi 8$ is now stored in the memory 10. That is, in the former case the current address word comes from the MB register, and in the latter case the current address word comes from the YA register. The MALDYA signal on the line 104 is the last signal which occurs at state $\phi 9$, and causes the MA register 30 to store the present current address (which is the start address of state $\phi 7$ plus one which was stored in the YA register 33). The cycle then returns to state $\phi 6$ as indicated by the circle 211.

If the A bit in the current address of state $\phi 6$ was a zero, the cycle continues to state $\phi 9$ as indicated by the box 212. The operation here is the same as is indicated by the box 210 except no A bit (and thus an A bit of zero) is stored in the YA register 33, and the PA register 32 is incremented by one. The cycle then continues to execute the command as indicated by the circle 213.

Figure 9:
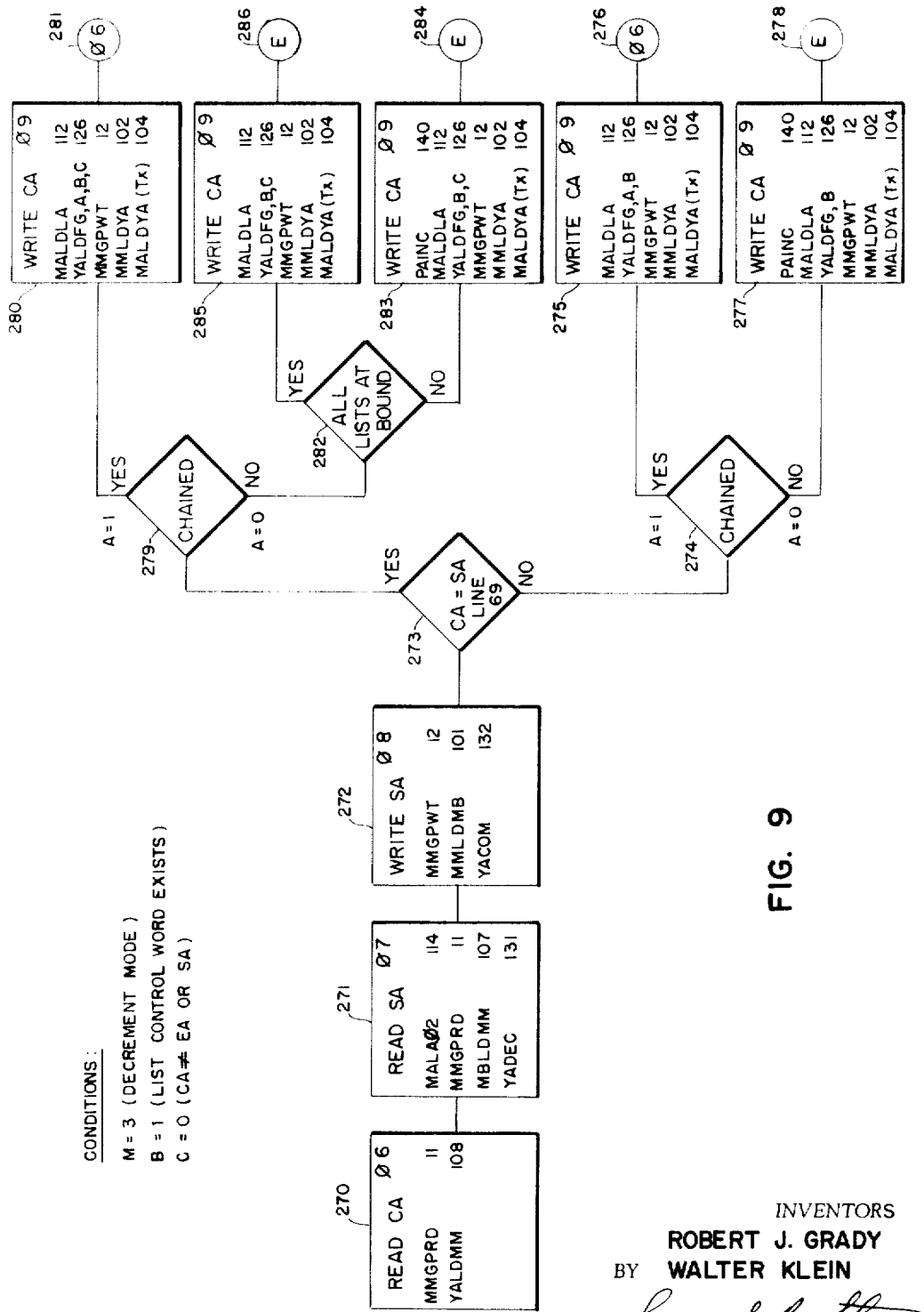
Figure 10:
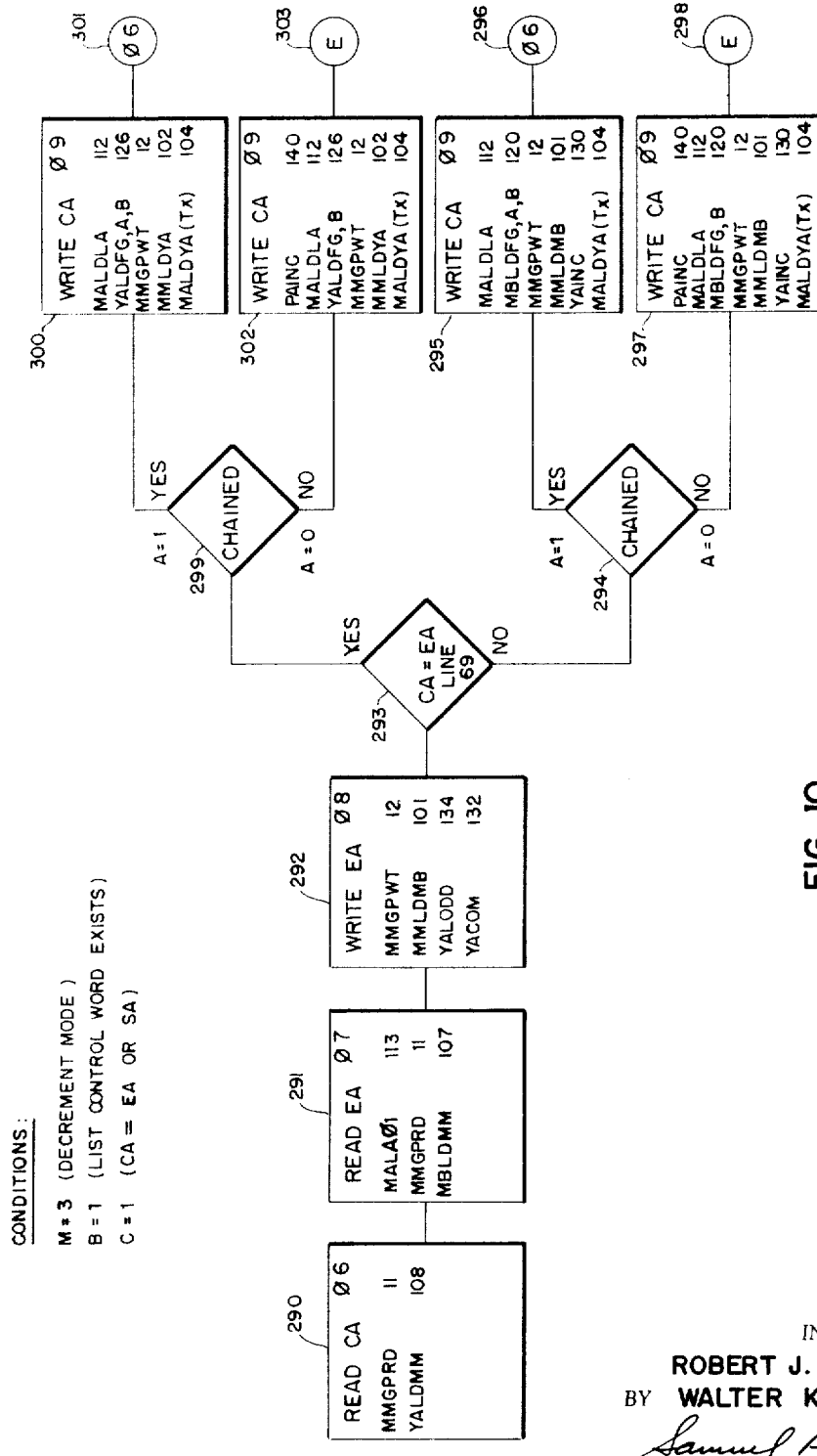

The foregoing discussion of FIGS. 4 through 6 has set forth the basic operation of the system shown in FIG. 1 under a number of the conditions of operation. FIGS. 8 through 10 show similar cycles of operation with different M codes. With an M code of 2, no incrementation or decrementation occurs, and with an M code of 3 decrementation (rather than incrementation) occurs. At this time, it is believed that it would be helpful to consider a specific over-all operation of the system shown in FIG. 1.

Reference should now be made to FIG. 7 which illustrates list control address modification, chaining of lists, and automatic command skip at a list boundary in a diagrammatic form. Briefly, FIG. 7 illustrates how a plurality of commands and list control words are stored to cause a reordering of data words or operands $A_1$, $B_1$, $C_1$ through $A_{100}$, $B_{100}$ and $C_{100}$. These A, B and C data words are not the same as the A, B and C flags associated with the current address. It is assumed that a plurality of the A, B and C data words are stored sequentially in a memory block as indicated by the box 220. All addresses and subscripts shown in FIG. 7 are in the octal code for convenience of illustration. Hence, there are 100 of each of the words A, B and C in octal notation which is 64 of each in decimal notation. These words are stored in sequential locations from addresses 1000 through 1277. As an example, these data may have been derived from a serial train of data from a rocket test stand. The data words are of the three types A, B and C which, for example, may represent signals from three separate transducers associated with the rocket test. These data are derived by sequentially sampling the outputs of the three transducers, converting these data to digital data and storing them in the memory 10. In many instances, it is desirable to reorder these data into a series of separate A words, B words and C words as indicated by boxes 221 through 223, respectively. It may be desirable to store the words $A_1$ through $A_{100}$ at addresses 2000 through 2077, the words $B_1$ through $B_{100}$ at the addresses 3000 through 3077, and the words $C_1$ through $C_{100}$ at the addresses 4000 through 4077. Thus the system in FIG. 1 can be operated to regroup stored data in any desired fashion. FIG. 7 illustrates only one example of many possible operations which will be apparent to those skilled in the art.

FIG. 7 illustrates the manner in which a command refers to a list control word or structure (current, end and start address by addressing the current address) which in turn addresses a list of data words. Additionally, this figure also illustrates how a command addresses a list control structure which in turn operates cyclically to address three indirect addresses, each of which in turn addresses a list control structure. The commands and list control words are stored in any desired memory locations.

A group of sequential commands which are stored in the memory 10 is indicated by a reference numeral 226. The addresses (563 through 567) of these commands are indicated to the left thereof. A first command at the address 563 indicates that the data at address 300 is to be loaded into an accumulator (not shown). The accumulator is connected to the cable 51 in FIG. 1 and merely serves to store a data word until it is operated upon at execution time. The M code in the first command at address 563 is one indicating that the increment mode is utilized. A second command at the address 564 is a branch command which states that the program should branch to address 565. A third command found at the address 565 indicates that the contents of the accumulator register should be stored as indicated at address 100. The M code is a one and hence the increment mode is utilized. A fourth command found at the address 566 is an exit command which will be the final command to be performed and indicates that the operation should go on to the next command or program. A fifth command found at the address 567 is a branch command which causes the sequence of operation to branch to address 563.

The first command at the address 563 is addressed as shown in FIG. 3. The address 563 is entered into the program address register 32 in FIG. 1. A signal is applied on the line 105 to condition the enter gates 36 to allow the address (563) in the PA register 32 to be transferred to the MA register 30. A signal is applied on the line 11 to the memory 10 and a signal is applied on the line 107 to the enter gates 53 to cause the command at the address 563 to be stored in the MB register 21. Also, a signal is applied on the line 108 to the enter gates 56 to cause this command to be entered into the YA register 33. At state $\phi 2$, the command is transferred from the YA register 33 into the sequence control 61 as discussed previously. A signal on the line 127 clears the most significant bits (all but the address) of the command stored in the YA register 33. A signal on the line 12 is applied to the memory 10 and a signal on the line 101 is applied to the enter gates 24 to cause the command to be returned to the memory 10 from the MB register 21 to the address (563) from which it was extracted. A signal is applied on the line 140 to the arithmetic unit 72 to increment by one the contents of the PA register 32. The PA register 32 now stores the address 564. The last signal, MALDYA, is applied on the line 104 to condition the enter gates 40 and allow the address specified by the first command to be transferred from the YA register 33 to the MA register 30. The MA register 30 now contains the address 300 which was specified in the first command. The operation now proceeds to state $\phi 6$.

The address 300 address a current address word indicated by the reference numeral 230. Since the B bit of the current address word 230 is a one, a list exists. The end and start addresses are indicated by the reference numerals 231 and 232. These three addresses are stored in adjacent memory cells, in this case addresses 300, 301 and 302. The current address has an A bit of zero indicating that lists are not chained, and a C bit of one indicating that the present current address is at a limit value (is equal to the end or start address). The current address word indicated by the reference numeral 230 addresses the address 1277, the end address word addresses the address 1277, and the start address addresses the address 1000.

FIG. 6 illustrates the manner in which the current address word 230 is first addressed. The current address word is read from the memory in state $\phi 6$ as indicated by the block 200 in FIG. 6. This current address word includes A, B and C bits of zero, one and one, respectively, and an address 1277 as shown in FIG. 7. This current address word is stored in the YA register 33. At state $\phi 7$, the start address word indicated by the reference numeral 232 is addressed by the MA register 30 by applying the signal MALA$\phi 2$ on the line 114 to the control gates 76. This start address word 232 which specifies an address of 1000 is stored in the MB register 21. At state $\phi 8$, the start address word stored in the MB register is returned to the memory 10, the start address is compared with the current address, and the start address incremented by one is loaded into the YA register 33. Since the current address is 1277 and the start address is 1000, the current address is not equal to the start address. Also, the A bit in the current address word 230 is a zero and, hence, the cycle continues to state $\phi 9$ as indicated by the box 207 in FIG. 6. Since the start address which is stored in the MB register 21 does not contain the flag bits of the current address 230, a signal MBLDFG is applied on the line 120 along with a signal on the line 122 to the control gates 80 to store a B bit of one in the MB register 21. The A bit of the initial current address word was a zero and the C bit now is a zero since the list is not at a limit, and hence zeroes are stored for the A and C bits in the MB register 21. The two least significant bits in the MA register 30 are reset to zero upon the occurrence of a signal on the line 112 connected to the control gates 76. The MA register 30 now contains the address of the current address word, which address is 300. A signal is applied on the line 12 to the memory 10 and a signal is applied on the line 101 to the enter gates 24 to cause the start address word stored in the MB register 21 to be transferred to the memory 10 and stored at the address 300. The current address word 230 shown in FIG. 7 now specifies the address 1000 rather than the address 1277. The YA register 33 is decremented, and this register now stores the present current address word (the start address of state $\phi 7$). The PA register 32 is incremented and now contains the address 565 which is the address of the store command. The line 104 supplies a signal to condition the enter gates 40 thereby allowing the present current address to be stored in the MA register 30 from the YA register 33. At this time, the PA register 32 has stored therein the address 565. The current address word having A, B and C bits of zero, one and zero, respectively, and an address of 1000 is stored at address 300 in memory. The same current address word is stored in the MA register 30. The cycle of operation illustrated in FIG. 6 now proceeds to execute the load command. In executing the load command, the data found at address 1000 which is the data word $A_1$ is transferred to the accumulator.

After the load command is executed, the next command is fetched. This command is the store command at the address 565 and is fetched as previously described in connection with the discussion of FIG. 3. This store command indicates that the contents of the accumulator register are to be stored at the address addressed by or indirectly addressed by the address 100 contained in the command. Assuming that the operations of sequence states $\phi 1$ and $\phi 2$ have been performed, the cycle proceeds to state $\phi 6$. At this time, the address 566 is stored in the PA register 32, and the address part of the command (100) is stored in the YA register 33 and in the MA register 30. The cycle of operation again proceeds as indicated in FIG. 6 because the increment mode is indicated by the M equal to one in the store command, and the B and C bits of the current address word at address 100 are ones. The current address word at the address 100 is identified by the reference numeral 236 and includes A, B and C bits which are ones and an address of 1402. The end and start addresses associated with the current address word 236 are identified by the reference numerals 237 and 238. The cycle of operation in this instance is the same as that discussed previously, except the A bit is now a one and the operation at state $\phi 9$ is indicated by the box 205 rather than by the box 207. The start address was stored in the MB register 21 at state $\phi 7$. The current address (1402) was compared with the start address (1400) at state $\phi 8$ and found not to be equal. Since, as discussed previously, the start address does not have appropriate A, B and C bits, these bits must be written into the MB register. Since the start and current addresses were not equal, a terminal condition has not been reached and a C bit of zero is entered into the MB register 21 (since no signal is applied on the line 123). Since the A and B bits of the current address word are ones, ones are written into these positions in the MB register 21 by applying signals on the lines 120, 121 and 122. The signal MALDLA is applied to the control gates 76 to reset the current address (100) into the MA register 30. Signals are applied on the line 12 to the memory 10 and on the line 101 to the enter gates 24 to read the address word (with an address of 1400) from the MB register 21 into the memory 10 at the address 100. Thus, a current address of 1400 is now stored at location 100 in the memory 10. The YA register 33 is decremented by one, and it now contains this same current address word. The enter gates 40 are conditioned and the current address of word (A of one, B of one, C of zero and address of 1400) is supplied to the MA register 30 from the YA register 33. The MA register 30 now contains the address 1400 which is the address of the next operand or indirect address. Since addresses were chained, the cycle returns to state $\phi 6$.

Since the current address word at the address 1400 includes an A bit of one, and B and C bits of zero, FIG. 4 illustrates the cycle of operation involved. The current address word indicated by the reference numeral 240 at the address 1400 is read from the memory 10 and into the YA register 33 at state $\phi 6$ as indicated by the box 163 in FIG. 4. Since the A bit in the current address word 240 is a one, addresses are chained and the cycle proceeds to state $\phi 9$ as indicated by the box 165 in FIG. 4. The current address in the YA register 33 is written back into the memory 10 upon the occurrence of the signal MMGPWT on the line 12 and the signal MMLDYA on the line 102. The enter gates 40 are conditioned and the MA register now stores the address 574. The sequence of operation returns to state $\phi 6$.

The current address word at the address 574 is designated by a reference numeral 242. Its associated end address and start address words are designated by the reference numerals 243 and 244, respectively. The current address word 242 has an A bit of zero, and B and C bits of one. Since the M code is one (in the store command) and the B and C bits are one, the sequence of operation proceeds as indicated in FIG. 6. The operations performed are identical to those performed on the first current address word 230 as indicated by the boxes 200, 201, 202, 203, 204 and 207. At the end of this cycle of operation, the current address at the address 574 is 2000, the address stored in the PA register 32 is 567, and the address stored in the MA register 30 is 2000. This latter address is the address of the memory slot into which the data word $A_1$ is to be stored. In the execute part of the cycle shown in FIG. 6 (which forms no part of the present invention) the data word $A_1$ is transferred from the accumulator register and stored at the address 2000 in the memory 10. The first cycle of operation in the reordering of the data words A, B and C is now complete. A typical time period for this entire cycle shown in FIG. 7 thus far discussed is approximately 35.2 microseconds.

Since all lists are not yet at bound, the cycles of operations essentially as above are reiterated. The PA register 32 now stores the address 567. This is the address of a branch command having a command address of 563 and an M code of zero. This branch command causes a branch back to the load command at address 563 in a conventional manner. Program address registers such as the register 32 normally are sequentially incremented by one to address successive commands (without skipping as described herein) until the end of a program when a branch command is executed. Hence, the particular operation of fetching the branch command indicated at address 567 forms no part of the present invention. This operation is accomplished in practice by performing the cycle shown in FIG. 3, but at the end of the cycle the branch (Br563) is executed thereby branching back to the command at address 563. The specific mechanization for this operation is not shown in detail in FIG. 1 because it forms no part of the present invention. Briefly, in performing the cycle shown in FIG. 3 the process advances to "execute" rather than to state $\phi 6$ as indicated by the circle 162 since the M code is zero. The branch command (Br563) is executed which causes the address (563) in this command, which was stored in the YA register 33 during this cycle in FIG. 3, to be transferred serially from the YA register 33 (from line 67) to the arithmetic unit 72 and then into the PA register 32 in the same manner that serial data is supplied from the scan switch 64 to the arithmetic unit 66 and then to the YA register 33.

The PA register 32 now stores the address 563 of the load command which in turn is fetched in the manner described in connection with FIG. 3. After this command is fetched, the PA register 32 contains an address of 564, and the MA register 30 contains the address 300, which is the address of the current address word identified by the reference numeral 230. At this time, the current address word includes an A bit of zero, a B bit of one, a C bit of zero and an address of 1000. Since the C bit is now zero (still in the increment mode, and the B bit is a one) the cycle of operation shown in FIG. 5 takes place. The current address word 230 is read from the memory 10 into the YA register 33 at sequence state $\phi 6$ as indicated by the box 180 in FIG. 5. The end address word is then addressed and read into the MB register 21 at state $\phi 7$. The contents of the YA register 33 are incremented by one. The end address word is returned to its appropriate slot (the address from which it was extracted) in the memory 10, and the incremented current address word is compared with the end address word in state $\phi 8$ as indicated by the box 182. Since the current address plus one is 1001 and the end address is 1277, the present current address is not equal to the end address. The A bit in the current address word is a zero, and hence there is no chaining. Therefore, the cycle proceeds to state $\phi 9$ as indicated by the box 187 in FIG. 5. At state $\phi 9$, the PA register 32 is incremented by one and now contains the address 565. A bit B of one is inserted in the YA register 33, and its contents (current address plus one) are returned to the memory 10 at address 300. Also, this new current address in the YA register 33 is stored in the MA register 30. The current address word stored at location 300 in the memory 10 has an A bit of zero, a B bit of one, a C bit of zero and an address of 1001. This same current address word is now stored in the MA register 30. This cycle goes on to execute the load command which causes the data at location 1001 which is the data word $B_1$ to be loaded into the accumulator. The PA register which was incremented once at state $\phi 2$ and again at state $\phi 9$ now contains the address 565.

The store command at address 565 is fetched as discussed in connection with FIG. 3 and the MB register now addresses the current address word 236. The PA register now contains the address 566. The current address word 236 now has an A bit of one, a B bit of one, a C bit of zero and an address 1400. The cycle of operation is as shown in FIG. 5 and is substantially identical to the previous cycle of operation discussed in connection with the current address word 230. However, the current address word 236 includes an A bit of one and the operation at state $\phi 9$ is as shown in box 185 in FIG. 5 rather than as in box 187. The only differences in operation are that the PA register 32 is not incremented and both A and B bits of one are restored in the YA register 33. At this time, the new current address (current address plus one which is 1401) is transferred from the YA register 33 into the slot 100 in the memory 10. This same current address word also is transferred to the MA register 30. Hence, the memory location now addressed by the MA register 30 is address 1401, and the cycle returns to state $\phi 6$.

The current address word at the location 1401 is identified by reference numeral 246 and is the same as the current address 240 except the address portion thereof is different (634). The cycle of operation is the same as that discussed above in connection with the current address word 240 and shown in FIG. 4. The current address word 246 is read (at state $\phi 6$) from and rewritten (state $\phi 9$) into the memory 10 at address 1401. This current address word 246 also is now stored in the MA register 30. The sequence of operation now returns to state $\phi 6$ and is as shown in FIG. 6.

The current address word at address 634 has an A bit of zero, a B bit of one, a C bit of one and an address of 3077. This current address word is identified by reference numeral 248 and has end and start addresses 249 and 250 respectively associated therewith. The sequence of operations is identical to that discussed above in connection with the current address word 242 in FIG. 6. That is, the current address word 248 is read into the YA register 33 at state $\phi 6$; the start address word 250 is read into the MB register 21 at state $\phi 7$; the start address word is returned to the memory 10, the current and end addresses are compared and found not to be equal and the start address incremented by one is stored in the YA register at state $\phi 8$; and at the state $\phi 9$ the PA register 32 is incremented, a B bit of one is stored in the MB register 21, the contents of the MB register are stored in the memory 10 at the address 634, the contents of the YA register 33 are decremented by one, and this same current address word (start address at state $\phi 7$) with an address of 3000 is stored in the MA register 30. Memory location 634 now contains a current address word having an A bit of zero, a B bit of one, a C bit of zero and an address of 3000. This same current address word is stored in the MA register 30. The operation continues to execute the command which causes the data word $B_1$ previously stored in the accumulator to be stored at address 3000 in the memory 10. Since the PA register 32 was incremented at state $\phi 9$ as shown by the box 187 in FIG. 5, it contains the address 567.

After the store command is executed, the next command is fetched. The PA register contains the address 567 which is the address of a branch command and causes a branch back to the load command at the address 563. The load command at the address 563 is fetched as before. The MA register 30 now contains the address 300 which addresses the current address word 230. The current address word 230 now has an A bit of zero, a B bit of one, a C bit of zero and an address of 1001. This current address of 1001 is incremented and compared with the end address as previously discussed above in connection with FIG. 5 when addressing the data word $B_1$. At the end of the cycle shown in FIG. 5, the data word $C_1$ is stored in the accumulator and the PA register 32 now contains the address 565.

The store command at the address 565 is fetched as shown in FIG. 3 resulting in the address 100 being stored in the MA register 30. The current address word 236 at the address 100 in the memory 10 contains an A bit of one, a B bit of one, a C bit of zero and an address of 1401. The cycle shown in FIG. 5 is repeated with the current address word 236 being incremented and compared with the end address word 237. At this time, the incremented current address (1401+1) is equal to the end address (1402). Since the A bit in the current address word 236 is a one, the addresses are chained and the cycle proceeds to state $\phi 9$ as shown by the box 190 in FIG. 5. The A, B and C bits in the YA register 33 are set to one. At this time the C bit is set to one to indicate that the process is at a limit condition. The contents of the YA register 33 (A, B, and C bits of one and an address of 1402) are returned to the memory 10 at address 100. This same current address word is stored in the MA register 30. The cycle proceeds to state $\phi 6$ as indicated by the circle 191 in FIG. 5.

The MA register 30 now addresses the current address word 252 at address 1402 in the memory 10. The current address word 252 has an A bit of one, a B bit of zero, a C bit of zero and an address of 720. As before in connection with the discussion of current address words 240 and 246, the cycle of events is as illustrated in FIG. 4. Thus, the MA register 30 now contains the current address word 252 and the process continues to state $\phi 6$.

As in the discussion of current address words 242 and 248, the MA register 30 now addresses a current address 254 at memory address 720. The cycle of operation is as shown in FIG. 6 and as discussed above in connection with the current address words 242 and 248. The current address word 254 includes an A bit of zero, a B bit of one, a C bit of one and an address of 4077. End address word 255 and start address word 256 are associated with the current address word 254. The cycle of events shown in FIG. 6 is repeated, ending at state $\phi 9$ as shown by the box 207. The PA register 32 is incremented to an address of 567, memory location 720 contains the current address word 254 with an A bit of zero, a B bit of one, a C bit of zero and an address of 4000 and the MA register 30 contains this same current address word. The process continues to execute the command which causes the data word $C_1$ stored in the accumulator to be stored at memory address 4000 in the memory 10. It should be noted that the list address word having the current address word 236 is now at an end. However, all lists are not at an end, i.e., the list address word at address 720 (with current address word 254) indirectly addressed by address 100 (and then address 1402) is not yet at an end and further cycles must occur before the entire program is completed.

The next command is fetched which causes a branch to the load command at address 563 as discussed previously. The process continues as discussed above with the data word $A_2$ now being addressed and stored in the accumulator. The current address word 236 is again fetched as shown in FIG. 6 (since the C bit again is a one) which in turn addresses the current address word 240 as shown in FIG. 4. The current address word 240 then addresses the current address word 242. The cycle of operation for the fetching of the current address word 242 now is as shown in FIG. 5 and the operation is the same as fetching the second current address word 230 which addressed the data word $B_1$ discussed previously. The cycle is as shown in FIG. 5 since the C bit now is a zero. The command is executed thereby storing the data word $A_2$ which has been held in the accumulator in memory location 2001.

The above operations continue with the data words $A_1, A_2 \ldots A_{100}$ being stored in memory locations 2000 through 2077, the data words $B_1, B_2 \ldots B_{100}$ being stored in memory locations 3000 through 3077, and the data words $C_1, C_2 \ldots C_{99}$ being stored in memory locations 4000 through 4076. A slightly different operation occurs in the last operation which is the storage of the data word $C_{100}$.

Assume now that all data words $A_1, B_1, C_1$, etc. have been loaded and stored except the data word $C_{100}$. The current address word 230 at address 300 now contains an address of 1276, the current address word 236 at location 100 now contains an address 1401, and the current address word 254 stored at the address 720 now contains an address 4076. The load command at address 563 causes the data word $C_{100}$ at address 1277 to be stored in the accumulator in a manner similar to that discussed previously. However, the cycle of operation proceeds in a different manner through FIG. 5 than before because the current address (1277) is now equal to the end address (1277). A list control word has existed since the B bit is a one, and since the current and end addresses of all list control words (only one in this case which is at address 300) for the present command (the load command at address 563) are equal (current address 1277 equals end address 1277), all lists are at bound. The cycle continues to state $\phi 9$ as indicated by the box 195 in FIG. 5. The operations are the same as previously discussed in connection with the box 187 except now both the B and C bits are set to ones and now the PA register 32 is not incremented. The C bit is set to one because the list is at a terminal condition. Since the PA register 32 is not incremented at state $\phi 9$, the next command (Br565) is not skipped but is executed. This branch command at address 564 is fetched and branches to the store command at address 565 in the same manner as discussed above in connection with the branch command (Br563) at address 567.

The store command at address 565 is fetched and addresses the current address word 236 at address 100 in the same manner as discussed previously. The current address word 252 at the address 1402 is addressed, which in turn addresses the current address word 254 at the address 720 in the same manner as discussed previously.

At this point a different operation occurs in order to terminate the program. The cycle is as shown in FIG. 5 with the current address word 254 (address 4076) being read into the YA register 33 at state $\phi 6$; with the end address word (address 4077) being read into the MB register 21, and the YA register 33 being incremented by one at state $\phi 7$; and the incremented current address (4076+1) being compared with the end address and equality being indicated at state $\phi 8$. The A bit in the current address word 254 is a zero and, thus the next decision is to determine whether all lists are at bound as indicated by the decision box 192 in FIG. 5. All lists are now at bound because the two necessary requirements are fulfilled. One, there has been a list and all lists which have occurred are now at a terminal condition. Two lists are involved with the present store command, the list associated with the current address word 236 and the current address word 254. In the last operations with the current address words 236 and 254, the current addresses were found to equal the respective end addresses. Referring to FIG. 1, the flip-flop 90 is set to one and the flip-flop 91 is set to zero (a nonequality sets this flip-flop to one). The AND gate 92 provides a one output indicating that all lists are at bound thereby causing the sequence control 61 to provide the appropriate output signals. Thus, the operations at state $\phi 9$ are as shown in the box 195 in FIG. 5. The bits B and C of one are stored in the YA register 33, and the contents of this register are transferred to the memory at address 720. The same contents of the YA register 33 are transferred to the MA register 30 to subsequently address the memory location 4077.

It should be noted that the PA register 32 has not been incremented in state $\phi 9$. Thus, the PA register 32 contains the address 566. The store command is executed with the data word $C_{100}$ which was stored in the accumulator now being stored in the memory 10 at address 4077. Subsequently, when the next command is fetched, an exit command is found at the address 566 which directs the equipment in FIG. 1 to go onto the next command or sequence of commands. This exit command also may be a halt command, thereby halting all operation.

It now should be apparent that FIG. 7 illustrates various cycles of operation capable with the system shown in FIG. 1. FIG. 7 illustrates how a command can address a list control structure by providing a single address (in this case address 300) to perform an operation on a list of data words ($A_1$, $B_1$, $C_1$, etc.). Although in the particular example given in FIG. 7 the data words $A_1$ through $C_{100}$ were merely loaded in an accumulator, the command could have called for mathematical or other operations to be performed on these data words.

FIG. 7 also illustrates how a single command can address a list control structure at a single address (in this case address 100) to cyclically perform an operation on a list of data. In the specific example shown in FIG. 7, the current address word 236 cyclically addresses the current address words 240, 246 and 252 over and over until all desired operations are performed. However, the data at addresses 1400, 1401 and 1402 could have been operands upon which arithmetic or other operations were to be performed. Also, as can be seen from FIG. 7 the current address words 240, 246 and 252 can address a list of operands (at addresses such as 574, 634, 720) which are not stored in adjacent memory locations. Any desired number (two or more) of words such as 240, 246 and 252 may be used rather than only three. FIG. 7 further illustrates the manner in which addresses may be linked with a single command address (address 100) effectively referring to a string of indirect addresses some of which are list control structures.

Additionally, FIG. 7 illustrates the manner in which a list of commands may be operated upon and whereby an intermediate command, such as an exit command, is periodically skipped until a boundary condition is reached. This operation also is useful when it is desired to perform an arithmetical operation (such as add) on a list of operands. A first command specifies add, a second command (which is skipped until all lists are at a bound) specifies exit or branch to another program, and a third command specifies a branch back to the first command.

FIGS. 8 through 10 illustrate other modes of operation of the equipment shown in FIG. 1. FIG. 8 illustrates the static mode of operation wherein the command code M is two. In this particular mode of operation, no incrementation or decrementation occurs. The current address word is read from the memory 10 at a specified address and stored in the YA register 33 at state $\phi 6$ as indicated by a box 260. A determination is made whether addresses are chained as indicated by a decision box 261 in FIG. 8. If the A bit is a zero, the operation proceeds to state $\phi 9$ as indicated by a box 262. The current address is read back into the memory 10 from the YA register 33 at the address from which it was extracted. This current address word also is stored in the MA register 30. The operation proceeds to execute the command as indicated by a circle 263. If the A bit is a one, the operation continues to state $\phi 9$ as shown by a box 264. The operation here is the same as that shown by the box 262 except the operation returns to state $\phi 6$ as indicated by a circle 265. The automatic command skip control is not used in the static mode (M equal two).

As discussed previously in connection with FIG. 4, this figure also shows the cycle of operation for the decrement mode (as well as the increment mode) when no list control word is involved. No decrementation actually takes place since the B bit is a zero.

FIG. 9 illustrates the cycle of operation in the decrement mode when a list control word exists and the current address is not equal to the end or start address. The current address is read from the memory 10 and into the YA register 33 at state $\phi 6$ as shown by a box 270. At state $\phi 7$ as indicated by a box 271, the start address word is addressed by applying a signal on the line 114 to the control gates 76 to set the second bit in the MA register 30 to a one. This causes the MA register 30 to now address the start address word (at address X+2). The start address word is read from the memory 10 and into the MB register 21. Since the decrement mode is involved, a signal is applied on the line 131 to the arithmetic unit 66 to decrement the contents of the YA register 33 by one. At state $\phi 8$ as indicated by the reference numeral 272, the start address word is read from the MB register 21 back into the memory 10 at the address from which it was extracted, and this start address word is compared with the decremented current address word.

After state $\phi 8$ in FIG. 9, all operations are identical to those shown and described in connection with FIG. 5. A decision is made whether the current address is equal to the start address as indicated by a decision box 273. A determination is made whether addresses are chained as indicated by a box 274. If the current and start addresses are not equal and addresses are chained, the cycle proceeds to state $\phi 9$ as indicated by a box 275 and ultimately returns to state $\phi 6$ as indicated by a circle 276. If addresses are not chained, the operation continues through state $\phi 9$ as indicated by a box 277 and on to execute the command as indicated by a circle 278. Again as in FIG. 5, if the current is equal to the start address a chained decision is made as indicated by a box 279 and a list at boundary condition decision is made as indicated by a box 282 with the process proceeding to state $\phi 9$ as indicated by one of the boxes 280, 283 or 285. Subsequently the operation returns to state $\phi 6$ as indicated by a circle 281, or goes on to execute the command as indicated by circles 284 or 286.

FIG. 10 illustrates the cycle of operation in the decrement mode where a list control word exists (the B bit is a one) and the current address is equal to the end or start address (the C bit is one). At state $\phi 6$ as indicated by a reference numeral 290, the current address word is read from the memory 10 into the YA register 33. At state $\phi 7$ as indicated by a reference numeral 291, the end address word is addressed by applying a signal on the line 113 to the control gates 76, and the end address word is read into the MB register 21. At state $\phi 8$ as indicated by a reference numeral 292, the end address word is returned to the memory 10, and the end address is compared with the current address. The YA register 33 is loaded with the one decremented contents of the MB register 21 in the same manner that the YA register was loaded with the one incremented contents of the MB register at state φ8 in FIG. 6. If the current address is not equal to the end address as indicated by a decision box 293, a chaining decision is made as indicated by a decision box 294. If addresses are chained, the cycle proceeds to state φ9 as indicated by a box 295. The operation here is identical to that shown in the box 205 in FIG. 6 with the exception that the YA register 33 is incremented as shown in FIG. 10 rather than decremented as shown in FIG. 6. At state φ9, the process returns to state φ6 as illustrated by a circle 296. If the A bit is a zero, the cycle continues to state φ9 as indicated by a box 297. The operation here is identical to that shown in the box 207 in FIG. 6, with the exception that the YA register 33 is incremented rather than decremented. The process continues to execute the command as illustrated by a circle 298.

If the current address is equal to the end address, a chaining decision is made as indicated by a box 299. If the A bit is a one, the process advances to state φ9 as indicated by a box 300. The operations here are identical to those discussed in connection with the box 210 in FIG. 6. The process then returns to state φ6 as illustrated by a circle 301. If the A bit is a zero, the cycle continues to state φ9 as illustrated by a box 302. The operations here are identical to the operations shown in the box 212 in FIG. 6. The sequence of events continues to execute the command as illustrated by a circle 303.

It now should be apparent that the present invention provides an exteremely flexible and powerful list control address modification means wherein a single list address may be referred to which in turn refers to a list of data. Additionally, the operation on the list of data may be performed cyclically.

Although an exemplary embodiment and illustrative modes of operation of the present invention have been disclosed and discussed, it will be understood that other applications and modes of operation are possible and that the embodiment disclosed may be subjected to various changes, modifications and substitutions without necessarily departing from the spirit of the invention.

What is claimed is:

1. In a digital data processor including a memory having a program stored in addressable cells with address codes N, N+1, N+2, . . . X, X+Y, X+Z, . . . S, S+1, S+2 . . . where N, S, X, Y and Z are arbitrary integers, for storing data words, each word consisting of a group of digital signals representative of a command to be executed including the address (direct or indirect) of an operand, or an operand to be processed, a memory address register for receiving and storing a group of digital signals representing the address of a memory cell from which a data word is to be read, a program address register for storing a group of digital signal representing the address of the next command to be executed, an address modification register adapted to receive an address of an operand, and in conjunction with an arithmetic unit adding or subtracting a numerical value from said address, a sequence control unit for controlling the operation states called for by an instruction being executed and for obtaining the next command to be executed in sequence from the cell specified by the contents of said program address register, the improvement comprising a list control structure comprising three words stored in memory locations X, X+Y, and X+Z, the word in location X representing a current address which is the address of the operand to be operated upon, the word in location X+Y representing an end address specifying the address of the last operand of a list stored in the memory to be operated upon, and the word in location X+Z representing a start address specifying the address of the first operand of said list of operands to be operated upon, said start address being equal to said current address the first time the list control structure is referred to by a command of said stored program, said address modification register being adapted to receive an address from the memory under control of said sequence control unit when an indirect address mode command is transferred thereto from said memory for execution, said address being taken from a memory cell specified by the address portion of the indirect address mode command, apparatus for sensing the presence of a digit in a first predetermined digit position of the address which, if taken from location X, is the current address of a list control structure, comparing apparatus responsive to the presence of a digit in said first predetermined digit position for determining whether said current address is equal to said end address read from the memory cell X+Y, apparatus for simultaneously sensing the presence of a digit in a second predetermined digit position of said current address for internal sequence control purposes, and in response thereto for substituting said start address from the memory cell X+Z for the current address in said address modification register which start address in said register becomes the current address and for substituting said start address read from the memory cell X+Z for the end address otherwise read from location X+Y, in the comparison performed by said comparing apparatus, apparatus for storing back in said memory cell X the current address incremented or decremented by adding or subtracting a predetermined number, said current address also being retained unaltered in said address modification register as the operand address for the indirect address mode command to be executed regardless of whether the current address is equal to said end address and for setting a digit in said second predetermined digit position of the current address as it is incremented or decremented and restored if the current address is equal to said end address, all in response to said comparing apparatus, and apparatus for storing in said memory cell X the start address incremented or decremented by adding or subtracting said predetermined number in response to the aforesaid sensing of a digit in said second predetermined digit position instead of the current address incremented or decremented as aforesaid.

2. Apparatus as defined in claim 1 in which the end address and start address in respective memory cells X+Y and X+Z being addressed by adding Y and Z to the address portion of the indirect address mode command stored in said memory address register depending upon whether the presence of a digit in said second predetermined digit position is sensed, the presence of a digit producing a control signal to add Z and the absence of a digit producing a control signal to add Y.

3. Apparatus as defined in claim 1 in which said list control structure is stored in three successive memory locations such that Y and Z are equal to 1 and 2 respectively.

4. Apparatus as defined in claim 1 wherein said indirect address mode command transferred to said third register includes a portion which specifies whether the current address of a list control structure is to be incremented or decremented upon being stored back in memory location X.

References Cited by the Examiner

UNITED STATES PATENTS 2,968,027   1/1961   McDonnell _____ 340—172.5

ROBERT C. BAILEY, *Primary Examiner.*

R. B. ZACHE, *Assistant Examiner.*